(12) United States Patent
Teraoka et al.

(10) Patent No.: US 6,530,656 B1
(45) Date of Patent: Mar. 11, 2003

(54) COLOR INK-JET RECORDING INK SET, INK-JET RECORDING METHOD, RECORDING UNIT, INK-CARTRIDGE, INK-JET RECORDING APPARATUS AND BLEEDING REDUCTION METHOD

(75) Inventors: Hisashi Teraoka, Odawara (JP); Yoshihisa Takizawa, Machida (JP); Yoichi Takada, Yokohama (JP); Yuko Yakushigawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 09/671,162

(22) Filed: Sep. 28, 2000

(30) Foreign Application Priority Data

Sep. 30, 1999 (JP) ............................. 11-280111

(51) Int. Cl.$^7$ ................................. B41J 2/01
(52) U.S. Cl. ..................... 347/100; 347/96; 347/101
(58) Field of Search ................ 347/100, 101, 347/96; 106/31.43, 31.58

(56) References Cited

U.S. PATENT DOCUMENTS

| | | | |
|---|---|---|---|
| 4,313,124 A | 1/1982 | Hara ........................... 346/140 |
| 4,345,265 A | 8/1982 | Blanchard ..................... 357/23 |
| 4,459,600 A | 7/1984 | Sato et al. ................... 346/140 |
| 4,463,359 A | 7/1984 | Ayata et al. ................... 347/1.1 |
| 4,558,333 A | 12/1985 | Sugitani et al. ............ 346/107 |
| 4,723,129 A | 2/1988 | Endo et al. .................... 346/1.1 |
| 4,740,796 A | 4/1988 | Endo et al. .................... 347/1.1 |
| 4,963,476 A | * 10/1990 | Sugimoto et al. ........... 430/574 |
| 5,427,611 A | 6/1995 | Shirota et al. .............. 106/31.29 |
| 5,439,515 A | 8/1995 | Kurabayashi et al. .... 106/31.37 |
| 5,451,251 A | 9/1995 | Mafune et al. ................ 106/22 |
| 5,482,545 A | 1/1996 | Aoki et al. ..................... 106/22 |
| 5,555,008 A | 9/1996 | Stoffel et al. ............... 347/100 |
| 5,620,793 A | 4/1997 | Suzuki et al. ................ 428/342 |
| 5,621,447 A | 4/1997 | Takizawa et al. ............. 347/88 |
| 5,623,294 A | 4/1997 | Takizawa et al. ............. 347/98 |
| 5,680,165 A | 10/1997 | Takizawa et al. ............. 347/88 |
| 5,734,403 A | * 3/1998 | Suga et al. ................... 347/100 |
| 5,801,738 A | 9/1998 | Stoffel et al. ............... 347/100 |
| 5,865,883 A | 2/1999 | Teraoka et al. ........... 106/31.32 |
| 5,911,815 A | 6/1999 | Yamamoto et al. ...... 106/31.27 |
| 5,976,233 A | * 11/1999 | Osumi et al. ............ 106/31.86 |
| 5,985,015 A | 11/1999 | Kanaya ...................... 106/31.6 |
| 6,007,182 A | 12/1999 | Matsubara et al. ........... 347/43 |
| 6,027,210 A | 2/2000 | Kurabayashi et al. ....... 347/100 |
| 6,062,674 A | 5/2000 | Inui et al. ...................... 347/43 |
| 6,238,045 B1 | * 5/2001 | Ono et al. ..................... 347/96 |

FOREIGN PATENT DOCUMENTS

| | | | |
|---|---|---|---|
| EP | 0 633 142 A1 | 1/1995 | |
| EP | 0 838 507 A1 | 4/1998 | |
| EP | 0879857 A2 | * 11/1998 | ............. B41J/2/01 |
| EP | 0 943 666 A2 | 9/1999 | |
| JP | 54-056847 | 5/1979 | |
| JP | 59-123670 | 7/1984 | |
| JP | 59-138461 | 8/1984 | |
| JP | 60-071260 | 4/1985 | |
| JP | 7-145336 | 6/1995 | |
| JP | 2783647 | 5/1998 | |
| JP | 10-183046 | 7/1998 | |

* cited by examiner

Primary Examiner—John Barlow
Assistant Examiner—Manish S. Shah
(74) Attorney, Agent, or Firm—Fitzpatrick, Cella, Harper & Scinto

(57) ABSTRACT

A set of color ink-jet recording inks for recording a color image on a recording medium by using at least a black ink and a color ink, wherein the black ink has a cationic self-dispersible carbon black and the color ink has an anionic dye and an anionic substance. This ink set can achieve a high printing density and good printing grade without bleeding between black image and color image. It has a high reliability as an ink-jet ink.

16 Claims, 15 Drawing Sheets

COLOR INK-JET RECORDING INK SET, INK-JET RECORDING METHOD, RECORDING UNIT, INK-CARTRIDGE, INK-JET RECORDING APPARATUS AND BLEEDING REDUCTION METHOD

BACKGROUND OF THE INVENTION

1. Field of the Invention

The present invention relates to a color ink-jet recording ink set, ink-jet recording method, recording unit, ink-cartridge, ink-jet recording apparatus and bleeding reduction method, to obtain color images of high density, grade, sharpness and quality by the ink-jet recording even on plain paper.

2. Related Background Art

Heretofore, in order to form a black image which is excellent in printing density, printing grade, waterproof, and lightfastness on plain paper by the ink-jet recording system. There has been proposed use of black pigment ink. Besides, there have been proposed an ink set which would not cause bleeding at the boundary between an image printed with black ink and an image printed with color ink, as well as the ink-jet recording method or apparatus using it. In Japanese Patent Application Laid-Open No. 7-145336, for example, there is described an ink set in which at least one ink is a polymer-containing anionic ink, and the bleeding is reduced by the mutual contact of the anionic ink with a cationic ink on a multicolor print element. In Japanese Patent Application Laid-Open No. 10-183046, there is described an ink set capable of reducing bleeding by combination use of a black ink containing a carbon-black pigment having a cationic group on its surface as a coloring material, and a color ink containing an anionic dye as the color material.

However, in the method as described in Japanese Patent Application Laid-Open No. 7-145336, where bleeding in multicolor printing is suppressed by mutual contact between an anionic ink and a cationic ink in the presence of a polymer, the polymer may adversely affect the ink reliability depending on the polymer type. This poor reliability means, if there is a certain time interval, one minutes, for example, between the ink ejection performance from a nozzle in recording, it may happen that the next ink droplet cannot be ejected steadily, causing disturbed printing (such a phenomenon is called "poor ejectability").

Besides, the method described in the above Japanese Patent Application Laid-Open No. 10-183046 uses a combination of a black ink using cationic carbon black and a color ink using an anionic dye, and the aggregates formed between the coloring materials suppress bleeding. However, with the ink-jet inks of which coloring material concentrations are not so high as to cause sufficient aggregation, there may happen, especially on the recording medium of high permeability such as normal paper, bleeding between black and color images, or a phenomenon called "haze" in the black image. Here, haze, a whitish black region which should be solid black, is caused as the black ink is drawn deep into the recording medium by the action of highly penetrable color ink in the boundary region between a color image and a black image, when image black ink and color ink are applied in the same scan.

SUMMARY OF THE INVENTION

The inventors of the present invention have been studying the black ink containing self-dispersible carbon black as the coloring material, as a black ink which can give black images of high grade and has a stable ink composition. The present inventors have studied the use of this black ink in multicolor image formation, and found out that the excellent properties of this black ink can give high grade multicolor image. To achieve a still higher grade of multicolor image, however, it has been found that bleeding control in the boundary region between the black image and the color image is necessary. At present, there is no sufficient technical knowledge for the use of black ink containing self-dispersible carbon black as the color material for the formation of multicolor images, and decisive technique for bleeding prevention has not yet been found.

The present invention was made with such a background, and one object of the present invention is to provide an ink set for color ink-jet recording, which can sufficiently suppress bleeding in the boundary region between the black ink and the color ink when used for a color image formation, and has reliability as an ink-jet recording ink.

Another object of the present invention is to provide an ink-jet recording method capable of forming a color image high in image density and excellent in grade.

Still another object of the present invention is to provide an ink-jet recording apparatus capable of forming a high grade color image, an ink cartridge, and a recording unit.

Still another object is to provide a method for steadily and sufficiently alleviating bleeding in the boundary region between the black ink-jet image and the color ink-jet image.

According to one aspect of the present invention, there is provided an ink set for color ink-jet recording comprising a black ink and a color ink, wherein the black ink comprises a cationic self-dispersible carbon black, and the color ink comprises an anionic dye and an anionic substance.

According to another aspect of the present invention, there is provided an ink-jet recording method, comprising the steps of:

ejecting a black ink comprising a cationic self-dispersible carbon black from an orifice in response to a recording signal; and ejecting a color ink comprising an anionic dye in response to a recording signal, wherein the color ink further comprises an anionic substance.

According to further aspect of the present invention, there is provided a recording unit, comprising:

a first ink container containing a black ink comprising a cationic self-dispersible carbon black;

a second ink container containing a color ink comprising an anionic dye and an anionic substance; and a head for ejecting the black ink in the first container and the color ink in the second container.

According to a still further aspect of the present invention, there is provided an ink cartridge, comprising:

a first ink container containing a black ink comprising a cationic self-dispersible carbon black; and a second ink container containing a color ink comprising an anionic dye and an anionic substance.

According to a still further aspect of the present invention, there is provided an ink-jet recording apparatus, comprising:

a first ink container containing a black ink comprising a cationic self-dispersible carbon black;

a second ink container containing a color ink comprising an anionic dye and an anionic substance; and a head section for ejecting the black ink and the color ink, respectively.

According to a still further aspect of the present invention, there is provided a method for alleviating bleeding in a boundary between a black image formed by an ink-jet method and a color image formed by an ink-jet method, wherein the black image is formed with a black ink comprising a cationic self-dispersible carbon black and the color image is formed with a color ink comprising an anionic dye and an anionic substance.

DETAILED DESCRIPTION OF THE PREFERRED EMBODIMENTS

Figure 1:
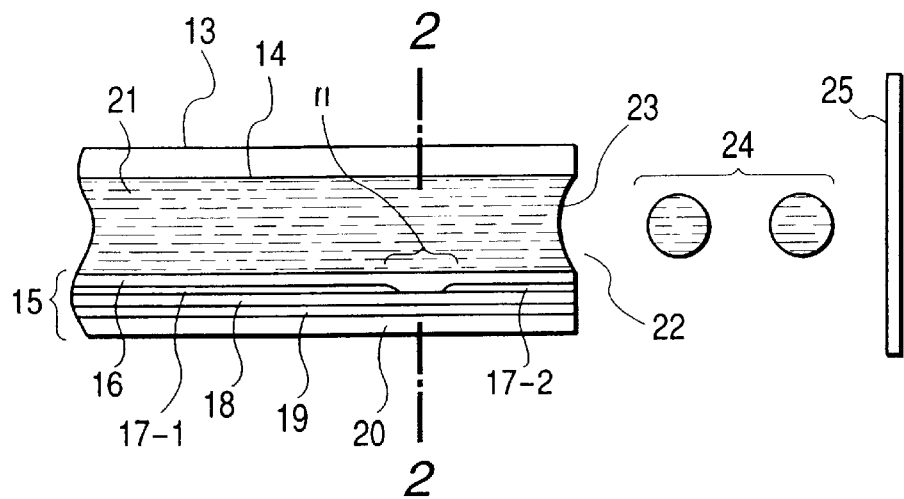
FIG. 1 is a vertical sectional view of an ink-jet recording apparatus head.

With preferred embodiments, the present invention will now be described in detail below.

As a result of hard and intensive study to solve the above technical problems, the present inventors have solved the problem involved in pigment ink while retaining the most of the merit of using pigment carbon black as the coloring material, and further found out a highly effective method to prevent the occurrence of bleeding with color ink when the black pigment ink is used with color ink for the multicolor printing, thus leading to the present invention.

First, in an ink set according to the present invention, it is used a black ink which comprises a cationic self-dispersible carbon black as the coloring material. As mentioned above, use of pigment ink is advantageous to obtain high image density or a perfect image durability, in comparison with dye ink. For this reason, various black inks containing carbon black as the coloring material have been developed for ink-jet recording. When such a pigment is used as the coloring material, however, a dispersant must be added to disperse the pigment into the ink, and in some case, an adverse influence due to the dispersant has been observed. When a polymer dispersant is used, for example, it may cause problems such as increased wettability of the face portion of a head, clogging, and poor preservation property of the ink. When a surfactant is used as the dispersant, the image density may become low, and there may be a problem of increased wettability of the face portion of the head in the ink-jet recording apparatus. On the other hand, use of a so-called self-dispersible carbon black can eliminate those problems caused by the dispersants.

As mentioned above, when carbon black whose surface is not treated, as the coloring material of ink, addition of a dispersant is needed to maintain the dispersion stability of the pigment. Still in that case, dispersion stability problem may exist, as well as the above discussed problems such as the increase wettability of the head face portion damaging the ink ejection stability. On the other hand, since self-dispersible carbon black has a hydrophilic group on its surface, the carbon black itself exhibits a stable dispersibility in an aqueous medium such as water, without adding any dispersant. Thus, pigment ink free from conventional problems due to the dispersant can be obtained.

Furthermore, with an ink set according to the present invention, color ink is used in combination with black carbon of the above composition, but an anionic coloring material is often used as the coloring material of color ink in use for the formation of a color image from the viewpoint of color developing property, light resistance or safety. For this reason, the use of a cationic coloring material for the color ink is desired to suppress the bleeding in an image formed of black ink and color ink. Thus, the present invention uses a cationic self-dispersible carbon black as the coloring material of black ink. Thereby, the image density, durability and printing grade in a black ink image can be improved and the preserving stability of ink and the reliability (ejection durability, ejection stability, clogging resistance or the like) during the recording becomes satisfying even for a pigment ink.

For an ink set according to the present invention, color ink is used with the above described black ink. The coloring material of color inks which has been used for color image formation are usually an anionic material from the view point of color development, light fastness, and safety. For this reason, it is preferable to use cationic material as the coloring material of the black ink, in order to suppress bleeding between the images formed with black ink and color ink. Thereby, the image density, durability and printing grade of black ink images can be improved, the storage stability of ink and the reliability in recording (ejection durability, ejection stability, clogging resistance or the like) are satisfactory even being a pigment ink.

For an ink set according to the present invention, color ink containing an anionic dye and at least one sort of anionic substance is used in combination with a black ink of above constitution, to intensify the aggregation force between the black ink and the color ink brought into contact on a paper sheet. Thus, bleeding between the black color image and the color ink image can be suppressed more effectively.

As the anionic substance, a substance having a carboxyl group or a sulfonic group is preferable, and more preferably, a substance having a plurality of sulfonic groups is employed. Specifically, a substance having an aromatic ring substituted with a sulfonic group, more preferably, with a plurality of sulfonic groups can be used. This is considered due to the stronger cohesion of the sulfonic group with a cationic group. Furthermore, the use of a substance having a plurality of sulfonic groups can intensify the cohesive force with a cationic group still more. Thus, bleeding suppression effect will be enhanced even when black and color inks are applied in one scan. Besides, it is preferable in the present invention to use an anionic dye having a sulfonic group in color ink.

The ink set according to the present invention aims at the suppression of bleeding between the black ink image and the color ink image as mentioned above, not considering bleeding between different color inks. Since color ink is frequently used for images graphs etc., it is preferable to avoid substantial deterioration in the printing grade in practical use, by using a known method such as providing the ink with a higher penetrability even into a sized paper.

Next, a black ink containing a cationic self-dispersible carbon black as the coloring material and a color ink containing an anionic dye and at least an anionic substance, both constituting an ink set according to the present invention, are described separately. As a preferable embodiment of the ink set, the anionic substance in the color ink contains a carboxyl group or a sulfonic group.

First, the black ink constituting an ink set of the invention is explained. The black ink to be used in the present invention is featured by containing a cationic self-dispersible carbon black. Most of cationic self-dispersible carbon blacks, already present or newly synthesized, can be used in this invention.

As the cationic self-dispersible carbon black, there are carbon blacks having at least one kind of cationic hydrophilic group bonded directly or through another atomic group to the surface as the ionic group. Use of such a self-dispersible carbon black dispenses with a dispersant to disperse carbon black particles in an aqueous medium.

As the cationic self-dispersible carbon black suitably usable in the present invention, preferably used are those having the hydrophilic group bonded directly or via another atomic group to the surface of carbon black, where the hydrophilic group may be composed of at least one aromatic group such as, phenyl, benzyl, phenethyl and naphthyl or a heterocyclic group such as pyridyl and at least one cationic group. More preferably, the cationic group is a quaternary ammonium group. Besides, those having a quaternary phosphonium group in place of a quaternary ammonium group are also useful.

As the cationic hydrophilic group bonded to the surface of self-dispersible carbon black preferably used in the present invention, those of the following structures are specifically referred to, but not limited to.

In the following formulas, R denotes a C1 to C12 straight or branched alkyl group, substituted or unsubstituted phenyl group, or a substituted or unsubstituted naphthyl group.

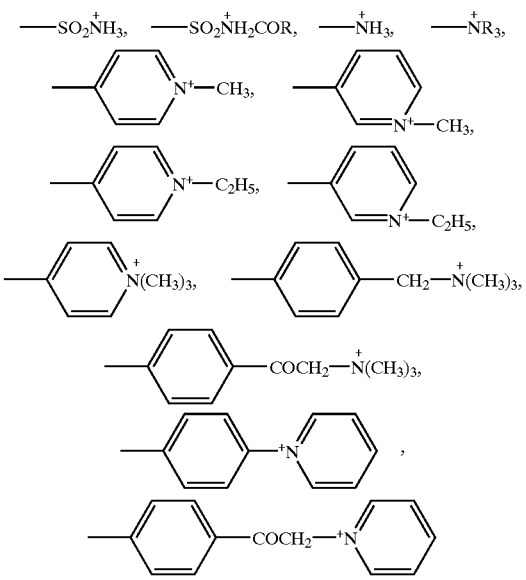

The content of the self-dispersible carbon black having a cationic group thereon as mentioned above in the black ink is not specifically limited, but preferably in the range between 0.5 to 15% to the total ink weight, more preferably in the range of 1.0 to 10%. Such a content can enhance the reliability as an ink-jet ink, such as printing density and ink ejection stability.

A preparation method of a cationically charged self-dispersible carbon black due to its hydrophilic group is explained with a method to introduce to carbon black an N-ethylpyridyl group:

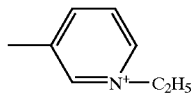

by treating carbon black with 3-amino-N-ethyl pyridinium bromide. Because of excellent water dispersibility due to the repulsion of ions, the anionically or cationically charged carbon black due to the hydrophilic group introduced onto the surface thereof retains a stable dispersion state without addition of a dispersant even in an aqueous ink.

As the carbon black used here, carbon black produced, for example, by the furnace process or the channel process, being 15 to 40 nm in primary particle diameter, 50 to 300 $m^2/g$ in specific surface area by the BET method, 40 to 150 ml/100 g in DBP oil absorption, 0.5 to 10% in volatile matter and of pH 2 to 9 is preferably used.

As examples of commercially available carbon blacks having such characteristics, No. 2300, No. 900, MCF 88, No. 33, No. 40, No. 45, No. 52, MA7, MA8, No. 2200B (the foregoing: Mitsubishi Chemical made), RAVEN 1255 (the foregoing: Columbia made), REGAL 400R, REGAL 330R, REGAL 660R, MOGUL L (the foregoing: Cabot made), Color Black FW-1, Color Black FW18, Color Black S170, Color Black S150, Printex 35, Printex U (the foregoing: Degoussa made), etc, are referred to.

Meanwhile, various hydrophilic groups as mentioned above may be bonded directly to the surface of black carbon, or may be indirectly bonded via an atomic group laid between the surface and the hydrophilic group. Here, specific examples of such an atomic group include straight or branched alkylene groups having 1 to 12 carbon atoms, substituted or unsubstituted phenylene groups and substituted or unsubstituted naphthylene groups. As the substituents for the phenylene groups and naphthylene groups, there are straight or branched alkyl groups having 1 to 6 carbon atoms. Specific examples of combinations of the atomic group and the hydrophilic group include, but not limited to, $-C_2H_4-COOM$, $-Ph-SO_3M$ and $-Ph-COOM$, where Ph represents a phenyl group and M an alkaline metal.

In this aspect., one or more kinds of self-dispersible carbon black selected from the above may be used as the coloring material of the ink, to control the tone or properties.

The black ink constituting an ink set according to the present invention comprises a cationic self-dispersible carbon black as described above can be present in an aqueous medium in a dispersion state. Any medium can be used as the aqueous medium so long as it contains water. The water content in the ink is, e.g. 20 to 95% by weight, especially 40 to 95% by weight, more preferably 60 to 95% by weight to the total ink weight. In addition to water, the aqueous medium may contain following water-soluble organic solvents. Appropriate examples are C1 to C4 alkyl alcohols (e.g. methyl alcohol, ethyl alcohol, n-propyl alcohol, isopropyl alcohol, n-butyl alcohol, sec-butyl alcohol and tert-butyl alcohol); ketones or keto-alcohols (e.g. ketoamides such as dimethyl formamide and dimethyl acetamide, acetone and diacetone alcohols); ethers (e.g. tetrahydrofuran and dioxane); polyalkylene glycols (e.g. polyethylene glycol and polypropylene glycol); alkylene glycols with C2 to C6 alkylene group (e.g. ethylene glycol, propylene glycol, butylene glycol, triethylene glycol, 1,2,6-hexane triol, thiodiglycol, hexylene glycol and diethylene glycol); alkylethers of polyvalent alcohols (e.g. ethylene glycol methyl ether, ethylene glycol ethyl ether, triethylene monomethyl ether and triethylene glycol monoethyl ether) and further N-methyl-2-pyrrolidone, 2-pyrrolidone, 1,3-dimethyl-2-imidazolidinone and so on. The total amount of the water-soluble organic solvent in the ink ranges from 2 to 60% by weight, more preferably, from 5 to 25% by weight on the basis of the total ink weight.

A specifically preferable water-soluble organic solvent in the present invention is glycerol added in an amount from 2 to 30% by weight, more preferably, from 5 to 15% by weight to the ink. Another preferable water-soluble organic solvent is a solvent mixture containing glycerol and a polyvalent alcohol (e.g. diethylene glycol and ethylene glycol) at a mixing ratio of glycerol to the polyvalent alcohol from 10:5 to 10:50. Examples of other preferable polyvalent alcohols to be mixed with glycerol are diethylene glycol, ethylene glycol, polyethylene glycol and propylene glycol. The above mentioned glycerol or mixture of glycerol and polyvalent alcohol may be mixed with another water-soluble organic solvent. If necessary, the black ink used in the present invention may further contain various additives such as, surfactant, pH control agent and antimold.

The black ink constituting an ink set of the present invention is suitable to be used in an ink-jet recording method, where an image is recorded by ejecting the ink from a recording head, by means of thermal energy or mechanical energy, and attaching it to a recording medium.

Thus, in order to be suitable for ink-jet recording, the black ink of the above constitution preferably has following physical properties at 25° C.; surface tension: 15 to 60 mN/m (dyn/cm), more preferably 20 to 50 mN/m (dyn/cm); viscosity: 15 mpa·s (cP) or less, more preferably, 10 mPa·s (cP) or less, further preferably 5 mpa·s (cP) or less; pH: 3 to 11, more preferably 3.5 to 8.

The ink set is characterized in that the black ink of the above mentioned constitution is used in combination with a color ink containing at least one anionic dye and at least one anionic substance. Such a color ink is described below on its constituents.

First, as an anionic dye preferable for the color ink constituting the ink set, most of already present, or newly synthesized anionic dyes can be used so long as they have suitable hue and density. Besides, they can be used alone or in combination. The content of the above anionic dye is preferably in a range of 0.2 to 15%, more preferably, 0.5 to 10% by weight based on the total ink weight. Namely, the anionic dye content in the above range enhances the reliability as the ink-jet ink, such as good coloring and ink ejection stability.

The anionic color ink used in the present invention contains at least one type of anionic substance in addition to the above anionic dye. Most of already present, or newly synthesized anionic substances can be used so long as they are anionic, but those having carboxyl group or sulfonic group are preferable. One example of anionic substances having a carboxyl group or a sulfonic group usable in the present invention is an organic acid salt, more specifically, anionic surfactant such as sodium alkylsulfate, sodium alkylsulfate, sodium dialkylsulfosuccinate, sodium alkylnaphthlenesulfonate, sodium alkyldiphenylether disulfonate, sodium alkylltaurine, sodium laurylsulfoacetate and sodium sulfosuccinate dialkyl ester; aromatic compounds having sulfone groups such as sodium benzenesulfonate, sodium benzenedisulfonate, sodium naphthalenesulfonate, sodium naphthalenedisulfonate and sodium naphthalenetrisulfonate; and carboxyl-group contained such as sodium benzoate and ammonium benzoate are referred to, but not limited to.

The content of the above anionic substance in the color ink is preferably in the range of 0.2 to 10% by weight, more preferably 0.5 to 8% by weight based on the total color ink weight. In other words, the content of the anionic substance in the above range achieves desired aggregation effect and ensures the reliability as the ink-jet ink.

Further, it is preferable for the color ink to contain a surfactant to have a fast penetrability into so-called plain paper. As examples of the surfactant, anionic surfactant as described above, nonionic surfactant such as higher alcohol ethylene oxide adducts, alkylphenol ethylene oxide adducts, aliphatic ethylene oxide adducts, polyvalent alcohol fatty acid ester ethylene oxide adducts, fatty acid amide ethylene oxide adducts, higher alkylamine ethylene oxide adducts, polypropylene glycol ethylene oxide adducts, fatty acid polyvalent alcohol esters and fatty amides of alcanol amines; and amphoteric surfactant of amino acid type or betaine type are referred to. Two or more of these surfactant can be selected and used as a mixture.

The content of the above anionic surfactant in the color ink is not limited but preferably in the range of 0.01 to 10% by weight based on the total color ink weight. In other words, the content of the anionic surfactant in the above range achieves desired penetration effect and ensures the reliability as the ink-jet ink.

Besides, for a rapid penetrability, it is effective for the color ink to contain an ether of polyvalent alcohol, for example, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, propylene glycol monobutyl ether and dipropylene glycol monobutyl ether. Furthermore, if the penetrability is not enough, a strongly penetrable water-soluble organic solvent such as hexylene glycol and dipropylene glycol can be added to enhance the penetrability into the recording medium such as plain paper.

In preparation of a color ink of above constitution, it is preferable to use water or a mixture of water and a water-soluble organic solvent as a liquid medium to disperse or dissolve the above anionic dye and anionic substance. Specifically preferable water-soluble organic solvents are those that can prevent drying of the ink. Specific examples include $C_1-C_4$ alkyl alcohols such as methyl alcohol, ethyl alcohol, n-propyl alcohol, iso-propyl alcohol, n-butyl alcohol, sec-butyl alcohol, and tert-butyl alcohol; amides such as dimethyl formaldehyde and dimethyl acetamide; ketones or ketoalcohols such as acetone and diacetone alcohol; ethers such as tetrahydrofurane and dioxane; polyalkylene glycols such as polyethylene glycol and polypropylene glycol; alkylene glycols with a $C_2-C_6$-alkylene group such as ethylene glycol, propylene glycol, butylene glycol, triethylene glycol, 1,2,6-hexane triol, thiodiglycol; hexylene glycol and diethylene glycol; lower alkyl ether acetates such as polyethylene glycol monomethylether acetate; glycerol; lower alkyl ethers of polyhydric alcohols such as ethylene glycol monomethyl- (or monoethyl-)ether, diethylene glycol methyl- (or ethyl-) ether and triethylene glycol monomethyl- (or monoethyl-)ether; polyhydric alcohols such as trimethylol propane and trimethylol ethane; N-methyl-2-pyrrolidone, 2-pyrrolidone and 1,3-dimethyl-2-imidazolidinone. Such water-soluble organic solvents may be used singly or as a mixture.

The content of the water-soluble organic solvent contained in the ink of the invention is not specifically limited, but preferably in the range of 3 to 50% by weight based on the total ink weight. The water content in the ink is preferably in the range of 50 to 95% by weight based on the total ink weight. It is desirable to use deionized water.

The color ink can be used for ink-jet recording as well as for hand-writing tools. As ink-jet recording methods, there are a recording method in which a mechanical energy is applied to the ink to eject an ink droplet and a recording method in which a thermal energy is applied to the ink to eject an ink droplet by the action of a bubble in the ink, for both of which the ink according to the present invention is especially suitable. When the ink set according to the aspect of the present invention is used for ink-jet recording, the ink should have suitable properties for ejection from an ink-jet head. From this point of view, the ink has liquid properties such as the viscosity of 1 to 15 cps, and the surface tension of preferably 25 mN/m (dyne/cm) or more, more preferably, 1 to 5 cps and 25 to 50 mN/m.

To provide the color ink with such properties, the aqueous medium preferably contains glycerol, trimethylolpropane, thioglycol, ethylene glycol, diethylene glycol, isopropyl alcohol, acetylene alcohol, and the like. As the acetylene alcohol, an acetylene alcohol of following formula can be used.

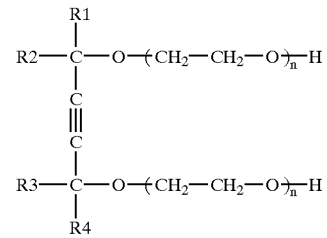

where R1, R2, R3 and R4 denote alkyl group and specifically, C1 to C4 straight or branched alkyl group, m and n denote 0 or an integer, provided that $0 \leq m+n \leq 30$.

In addition to these constituents, if necessary, the color ink may further contain following additives to have desired performance; nitrogen-contained compounds as a humectant such as urea, thiourea, ethylene urea, alkyl urea, alkyl thiourea, dialkyl urea and dialkyl thiourea: pH controlling agent; viscosity controlling agents; preservatives; antioxidants, evaporation accelerators, rust inhibitors, anti-molds and cheleting agents.

The above explained ink set of the present invention comprised of the black and the color ink is suitably used in the ink-jet recording method, in which an ink droplet is ejected from the ejection orifice according to the recording signal to make record on the recording medium, especially in the ink-jet recording system utilizing thermal energy the for ink droplet ejection. As a recording method for using an ink set according to the present invention to appropriately perform the recording, the ink-jet recording method of giving the thermal energy corresponding to a recording signal to the ink of individual colors stored in the recording head to generate a liquid droplet by the relevant thermal energy is referred to. One example of the ink-jet recording apparatus according to the present invention will be described below to which such an ink-jet recording method is applied.

Figure 2:
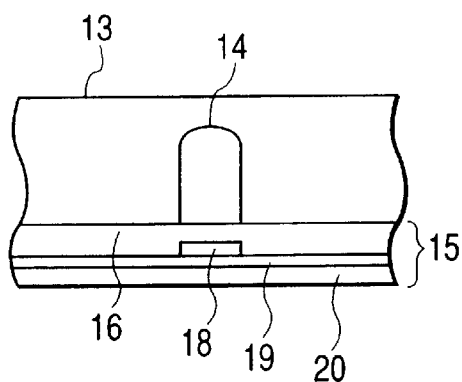
FIG. 2 is a vertical sectional view of an ink-jet recording apparatus head.
Figure 3:
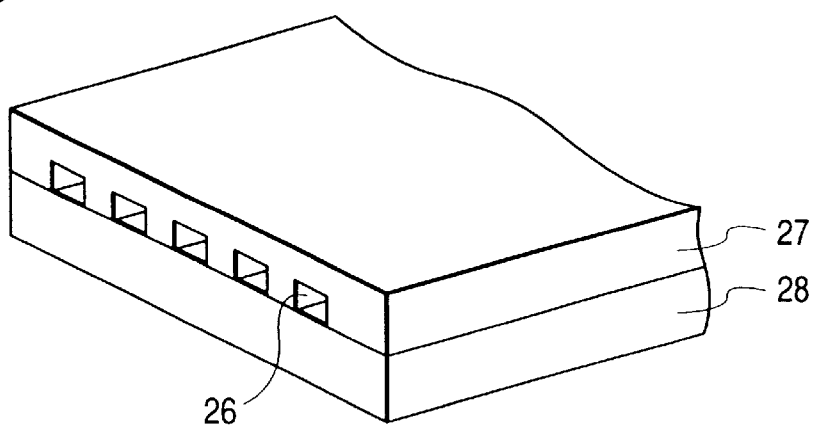
FIG. 3 is a perspective appearance view of a head multiplexed from the head shown in FIG. 1.

First, a configuration example of the main part, head, of this apparatus is shown in FIGS. 1, 2 and 3. FIG. 1 is a sectional view of a head 13 along the ink flow path and FIG. 2 is a sectional view taken on line 2—2 of FIG. 1. The head 13 is obtained by adhesion of a heat generating head 15 used for the thermosensitive recording (in FIG. 1, a film head is shown, but the present invention is not limited to this) to a glass, ceramic or plastic plate having a groove 14 through which ink flows. The heat generating head 15 comprises a protective film 16 formed of silicon oxide or the like, aluminum electrodes 17-1 and 17-2, a heat generating resistance layer 18 formed of Nichrome, a heat accumulating layer 19 and a highly heat-radiating substrate 20 made of alumina or the like.

The ink 21 comes to an ejection orifice (fine hole) 22 and forms a meniscus 23 under the pressure P. Now, when an electric signal information item is applied to the aluminum electrodes 17-1 and 17-2, the region designated with n of the heat generating head 15 is rapidly heated, a bubble is generated in the ink 21 contacting here, the meniscus 23 protrudes under this pressure and the ink 21 is ejected to make an ink droplet 24 and fly to a recording medium 25 from the ejection orifice 22.

FIG. 3 shows an appearance view of a multihead comprised of an array of many heads shown in FIG. 1. The relevant multihead is fabricated by a close adhesion of a heat generating head 28 similar to that described in FIG. 1 to a glass plate 27 having a multi-groove 26.

Figure 4:
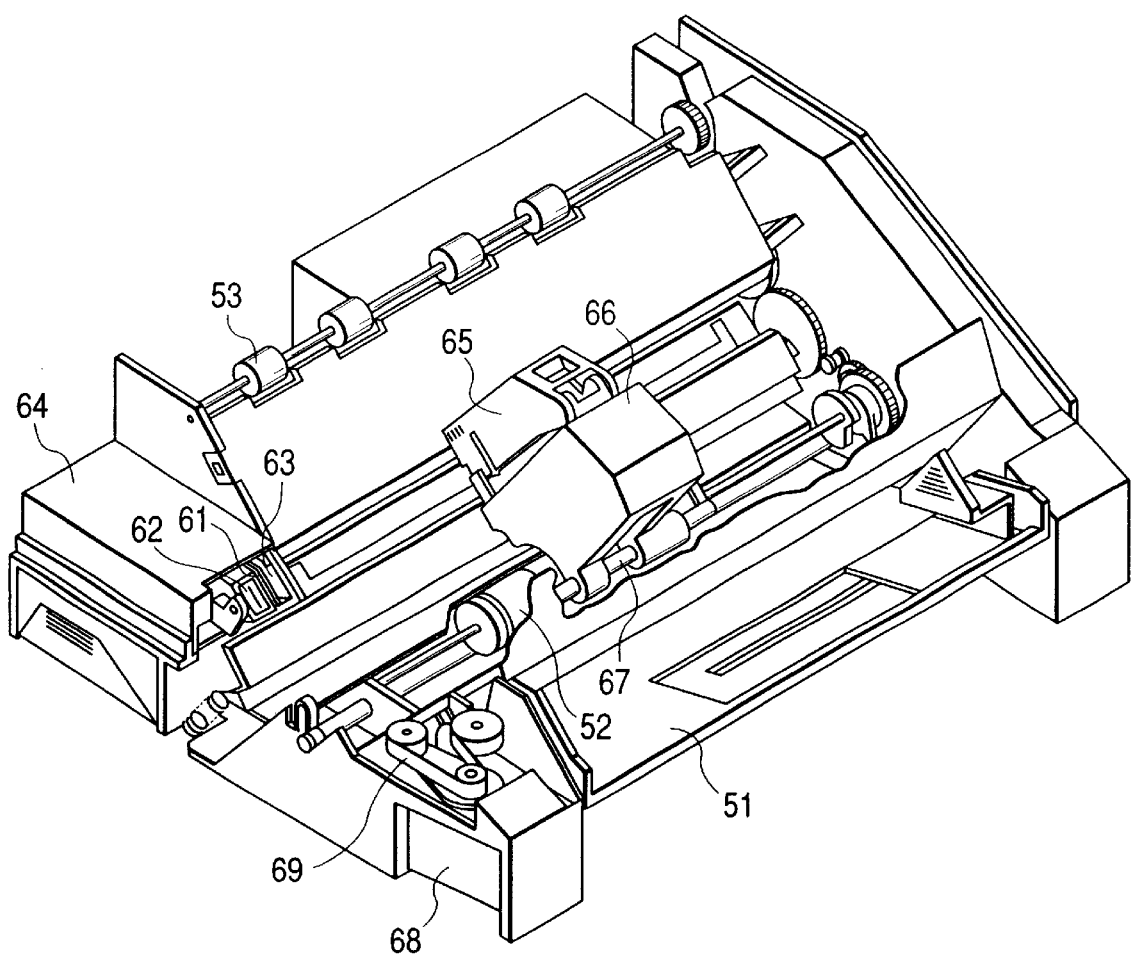
FIG. 4 is a perspective view of one example of ink-jet recording apparatus.

FIG. 4 shows one example of an ink-jet recording apparatus with the above head incorporated. In FIG. 4, numeral 61 denotes a blade serving as the wiping member, one end of which is retained by a blade retaining member to make a stationary end, thereby shaping a cantilever as a whole. The blade 61 is disposed at a position adjacent to the recording area by the recording head 65 and is retained in the shape of protruding into the moving route of the recording head 65 in case of this example. Numeral 62 denotes a cap on the ejection orifice surface of the recording head 65, which is located at the home position adjacent to the blade 61 and so arranged as to move in a direction perpendicular to the movement of the recording head 65, to butt against the ink ejection orifice and to fulfill the capping. Furthermore, Numeral 63 denotes an ink absorber provided adjacently to the blade 61, which is retained in the shape of protruding into the moving route of the recording head 65 as with the blade 61.

An ejection recovering section 64 comprises the above blade 61, the above cap 62 and the above ink absorber 63 and the moisture, dust and the like on the ink ejection orifice are removed by the blade 61 and the ink absorber 63. Numerals 65 and 66 denotes a recording head equipped with ejection energy generating means which ejects ink to the recording medium opposed to the ejection orifice face from an ejection orifice disposed to perform recording and a carriage for loading and moving the recording head 65, respectively. The carriage 66 is slidably engaged with a guide shaft 67 and part of the carriage 66 is connected (not shown) to the belt 69 driven by a motor 68. Thereby, the carriage 66 is enabled to move along the guide shaft 67, thus enabling the recording area by the recording head 65 and its adjacent areas to move.

Numerals 51 and 52 denote a paper feed section for inserting a recording medium and a paper feed roller driven by an not shown motor, respectively. By these constituents, the recording medium is fed to the position opposed to the ejection orifice face of the recording head 65 and paper is discharged to the paper discharge section disposed with the paper discharge roller 53 according to the progress of recording.

In a return of the recording head 65 to the home position at the end of recording or the like with the above configuration, the cap 62 of the ejection recovering section 64 is averted from the moving route of the recording head 65, whereas the blade 61 protrudes into the moving route. As a result, the ejection orifice face of the recording head 65 is wiped. When the cap 62 caps the ejection orifice face of the recording head 65 by butting, the cap 62 moves in such a manner as to protrude into the moving route of the recording head.

When the recording head 65 moves from the home position to the recording start position, the cap 62 and the blade 61 stand at the same position as that of the above wiping. As a result, the ejection orifice face of the recording head 65 is wiped also in this move. The above move of the recording head 65 to the home position is not only performed at the completion of recording and at the recovery of ejection, but also the recording head 65 moves at given intervals to the home position adjacent to the recording area while moving through the recording area for recording and the above wiping is carried out with this move.

Figure 5:
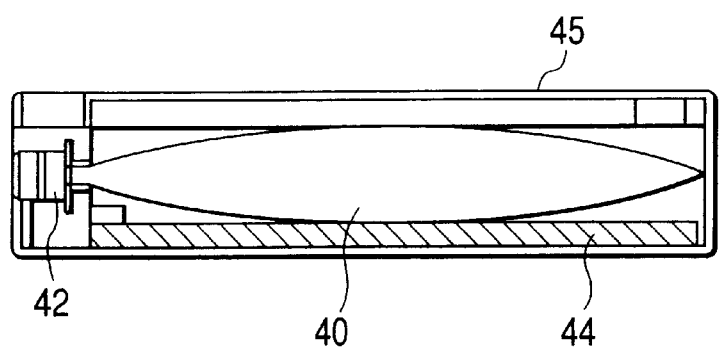
FIG. 5 is a vertical sectional view of an ink cartridge.

FIG. 5 shows one example of an ink supply member for the head, an ink cartridge 45 for storing the ink supplied via a tube. Here, numeral 40 denotes an ink storing section for storing the supply ink, e.g. an ink bag, at the tip of which a rubber stopper 42 is provided. By inserting a needle (not shown) into this stopper 42, the ink in the ink sack 40 is enabled to be supplied to the head. Numeral 44 denotes an ink absorber for receiving the waste ink. As the ink store section, it is preferable for the present invention that the liquid contact surface with ink is made of polyolefin, especially polyethylene.

Figure 6:
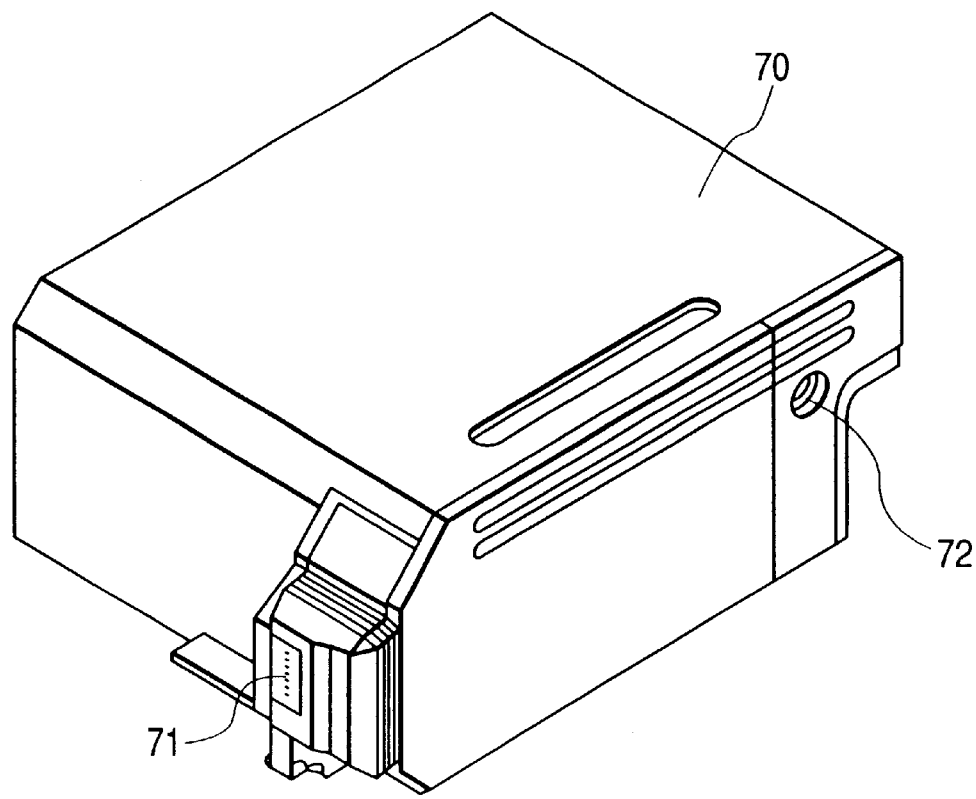
FIG. 6 is a perspective view showing one example of recording unit.

An ink-jet recording apparatus according to the present invention is not limited to those comprising a head and an ink cartridge separately as mentioned above, but is also appropriately applied to integrated one as shown in FIG. 6. In FIG. 6, numeral 70 denotes a recording unit in which an ink store section for storing ink, e.g. an ink absorber is accommodated and the ink in such an ink absorber is ejected as an ink droplet from the head section 71 having a plurality of orifices.

As materials of an ink absorber, polyurethane, cellulose, polyvinyl acetate or polyolefin type resin is preferably used. Numeral 72 denotes an atmosphere communicative orifice for communicating the recording unit interior to the atmosphere. This recording unit 70 is used in place of the recording head 65 shown in FIG. 4 and is freely mountable and demountable.

At the left end of a movable region of the carriage, an ejection recovery system unit 110 is present at the bottom and caps the ejection orifice section of a recording head at the time of non-recording. This left end is referred to as home position of a recording head. Numeral 107 denotes both a switch section and a display element section. The former is used for ON/OFF of the power supply of a recording apparatus, at the setting of various recording methods or the like, while the latter plays a part of displaying the condition of a recording apparatus.

Figure 7:
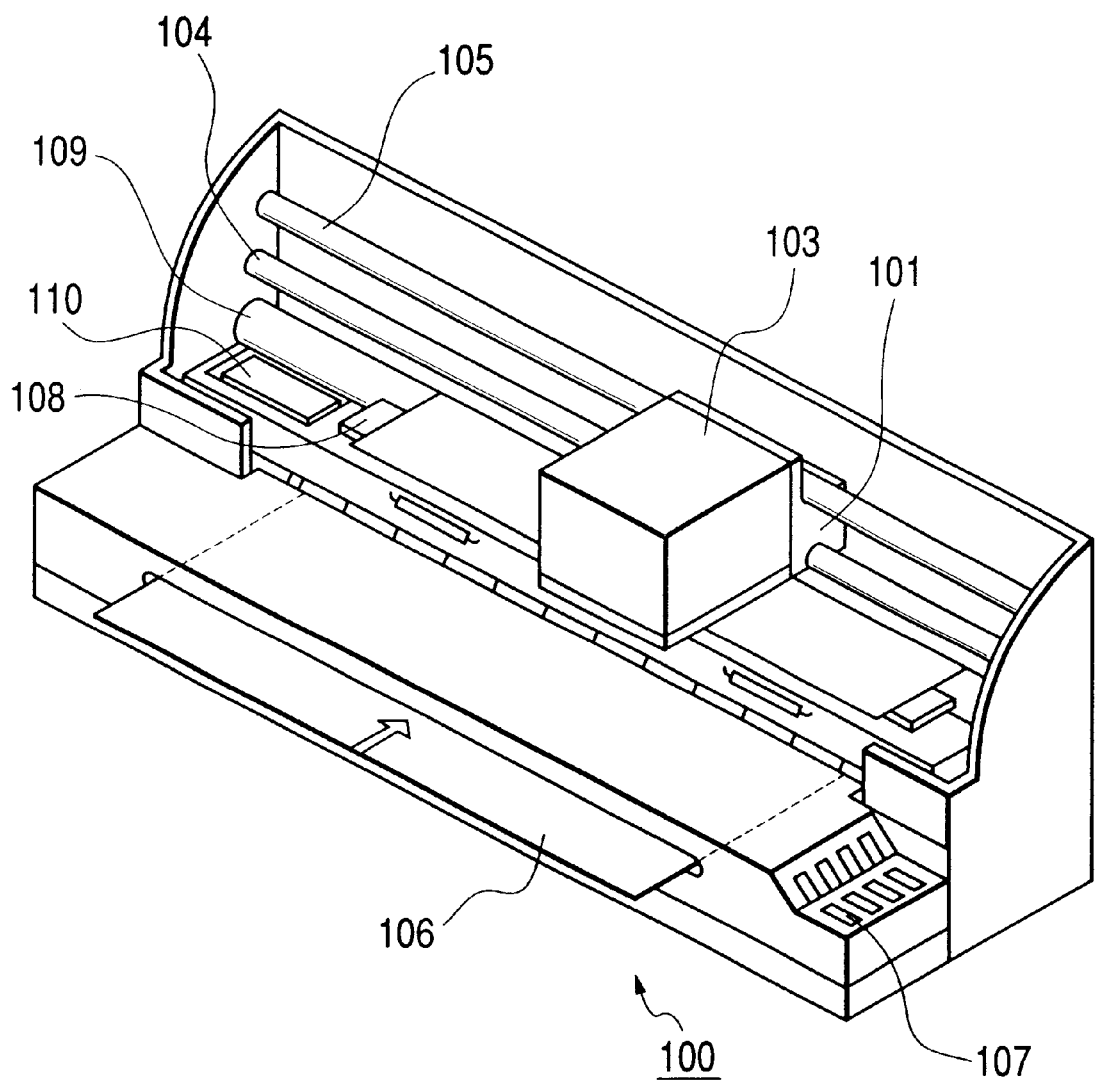
FIG. 7 is a perspective view of an ink-jet recording apparatus.

FIG. 7 is a perspective view of an ink-jet recording apparatus applicable to the present invention. The recording medium 106 inserted in the paper feed position of a recording apparatus 100 is conveyed to the recordable area of the recording head unit 103 by the feed roller 109. Below the recording medium in the recordable area, a platen 108 is provided. The carriage 101 is so arranged as movable in the direction determined by two guide shafts of a guide shaft 104 and a guide shaft 105 and scans the recording area reciprocally. On the carriage 101, a recording head unit 103 including multiple recording heads for ejecting individual color ink and ink tanks for supplying ink to respective recording heads is loaded.

Multiple color inks provided in this example of ink-jet recording apparatus are black (Bk), cyan (C), magenta (M) and yellow (Y) inks.

Figure 8:
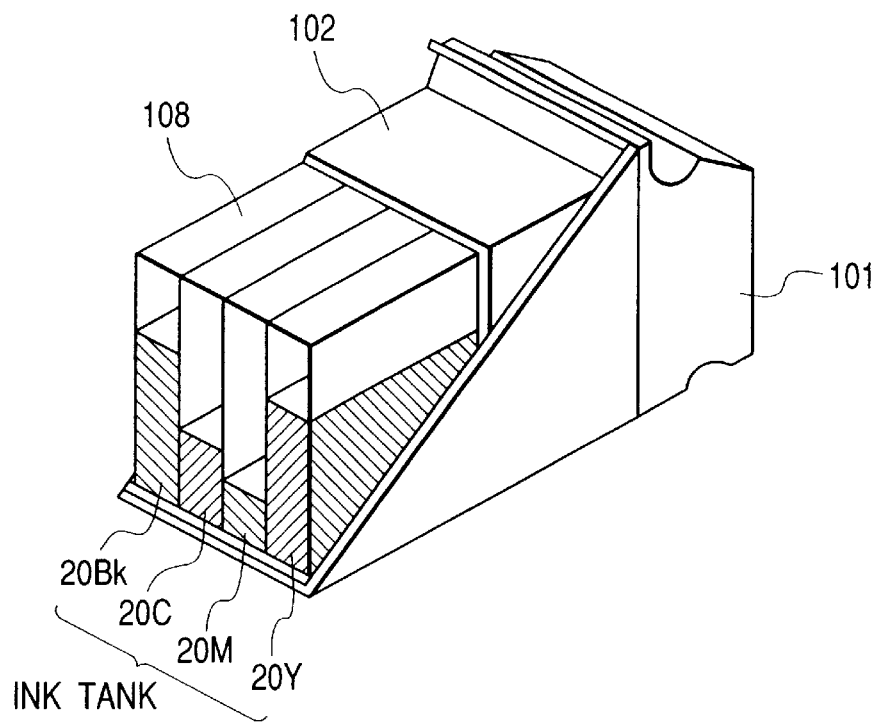
FIG. 8 is a perspective view showing the recording head unit in FIG. 7.

FIG. 8 is a perspective view showing the recording head unit of FIG. 7.

On the carriage 101, a recording head 102 for ejecting individual color ink of Bk, C, M and Y, a Bk ink tank 20Bk, a C ink tank 20C, a M ink tank 20M and a Y ink tank 20Y are loaded. Each tank is connected to the recording head via the connecting section with the recording head and is supplied to the respective ejection orifice.

Other than this example, tanks for individual color ink comprising C, M and Y may be integrally structured.

Figure 9:
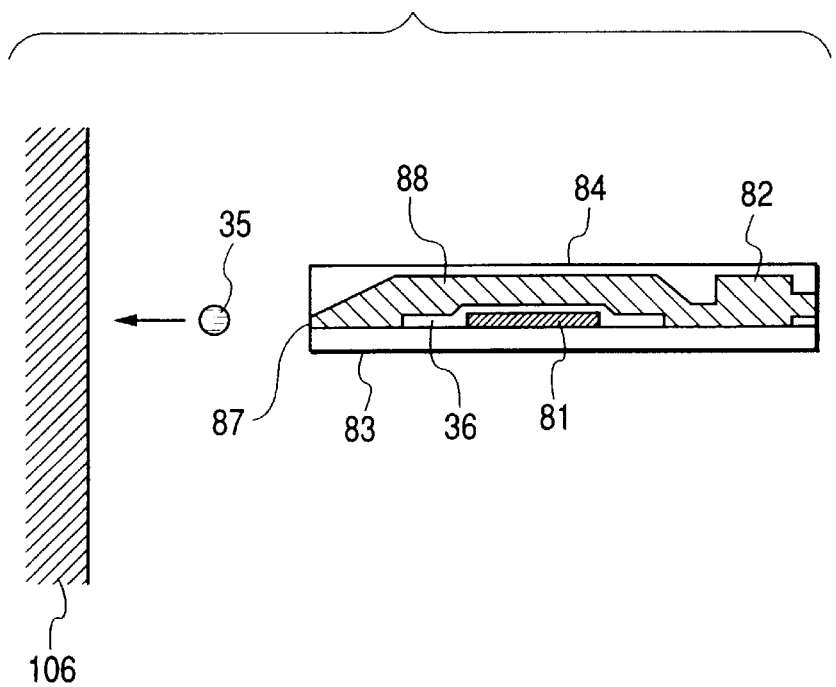
FIG. 9 is an enlarged sectional view of the neighborhood of the heat generating element of a recording unit.

FIG. 9 is an enlarged sectional view of the vicinity of the heat generating body of a recording head. An ink-jet recording apparatus according to this example adopts a recording method for ejecting ink from each nozzle by disposing a heat generating member made of a electrothermal converting element to each ink ejection orifice and by applying driving signals corresponding to the recording information to the heat generating member. Heat generating member 30 is so arranged as able to independently heat each nozzle.

The ink in a nozzle rapidly heated by the heat generation of a heat generating body 30 forms a bubble through the film boiling, an ink droplet 35 is ejected toward a recording medium 106 under pressure of this bubble generation as shown in FIG. 9 to form a character or an image on the recording medium. At individual ejection orifices 37, ink flow paths communicating with the respective ejection orifices are provided and a common liquid chamber 32 for supplying ink to these ink paths is provided behind the location of ink liquid paths 38. In each ink flow path corresponding to each ejection orifice, there is provided the heat generating member 30 made of an electrothermal converting element to generate thermal energy for ejecting an ink droplet from the ejection orifice, with electrode wiring for supplying electric power to it. These heat generating members 30 and electrode wiring are formed on the substrate 33 made of silicon or the like by the film forming technique. On each heat generating member 30, a protective film 36 is formed so that ink is not brought into contact with the heat generating member. Furthermore, by stacking a barrier 34 made of a resin or glass material on this substrate, the ejection orifices, the ink liquid paths, the common liquid chamber mentioned above or the like are configured.

As mentioned above, the recording system using a heat generating member being an electrothermal converting element is commonly referred to as the bubble jet recording system, since it utilizes a bubble formed by application of thermal energy for ejecting an ink droplet. In the above description, the invention is explained referring to an ink-jet recording apparatus of bubble-jet system, but ink-jet recording apparatuses of other ink-jet systems such as the piezoelectric system using piezoelectric elements may be employed.

Figure 10:
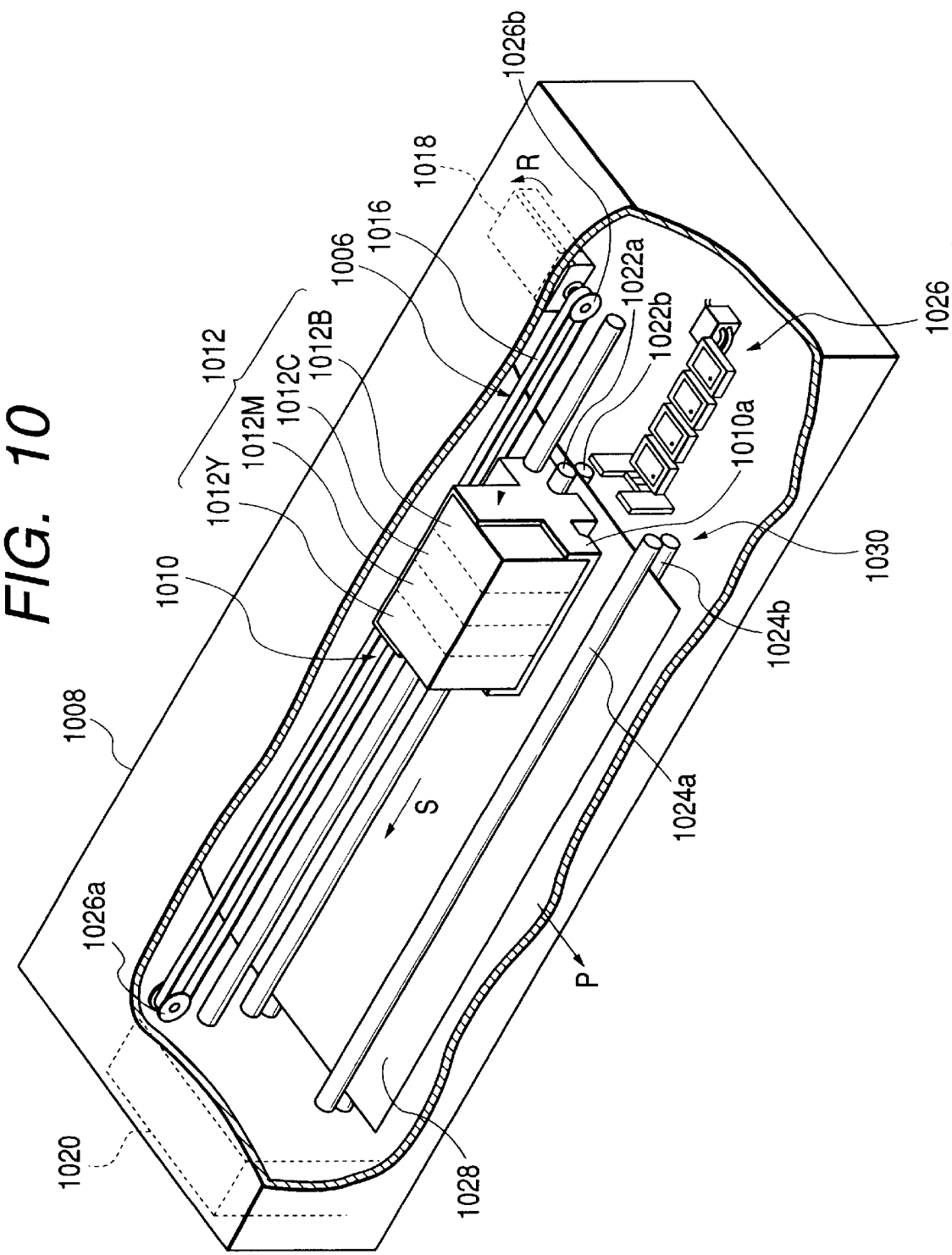
FIG. 10 is a schematic perspective view showing the principal portion of one example of ink-jet printer, on which a liquid ejection head is loadable.

Next, a specific example of the recording apparatus and recording head usable appropriately for the present invention will be described. FIG. 10 is a schematic perspective view showing a main part of an ink-jet printer employing a liquid ejection head of one liquid ejection system where the bubble is communicated with the atmosphere during ink ejection process.

In FIG. 10, the ink-jet printer includes a conveying device 1030 for intermittently conveying a sheet 1028 as recording medium provided along a longitudinal direction in a casing 1008 in the direction pointed by the arrowhead P shown in FIG. 10, a recording section 1010 reciprocally moved in nearly parallel with the direction S nearly perpendicular to the conveying direction P of the sheet 1028 by the conveying device 1030 and a move driving section 1006 as driving means for reciprocally moving the recording section 1010.

The move driving section 1006 includes a belt 1016 entrained about pulleys 1026a and 1026b placed at rotating shafts disposed oppositely at a given interval and a motor 1018 for driving the belt 1016 disposed in nearly parallel with roller units 1022a and 1022b and linked to the carriage member 1010a in the recording section 1010 forward and backward.

When the motor 1018 is put into operation and the belt 1016 rotates in the direction of the arrowhead R of FIG. 10, the carriage member 1010a of the recording section 1010 is moved by a given move amount in the direction of the arrowhead S of FIG. 10. On the other hand, when the motor 1018 is put into operation and the belt 1016 rotates in the reverse direction of the arrowhead R of FIG. 10, the carriage member 1010a of the recording section 1010 is moved by a given move amount in the reverse direction of the arrowhead S. Furthermore, on one end of the move driving section 1006, a recovery unit 1026 for the ejection recovery treatment of the recording section 1010 is provided opposite the ink ejection orifice array of the recording section 1010 at the home position of the carriage member 1010a.

In the recording section 1010, ink-jet cartridges (hereinafter, referred to simply as cartridges in some cases) 1012Y, 1012M, 1012C and 1012B is demountably provided to the carriage member 1010a respectively for individual colors, e.g. yellow, magenta, cyan and black.

Figure 11:
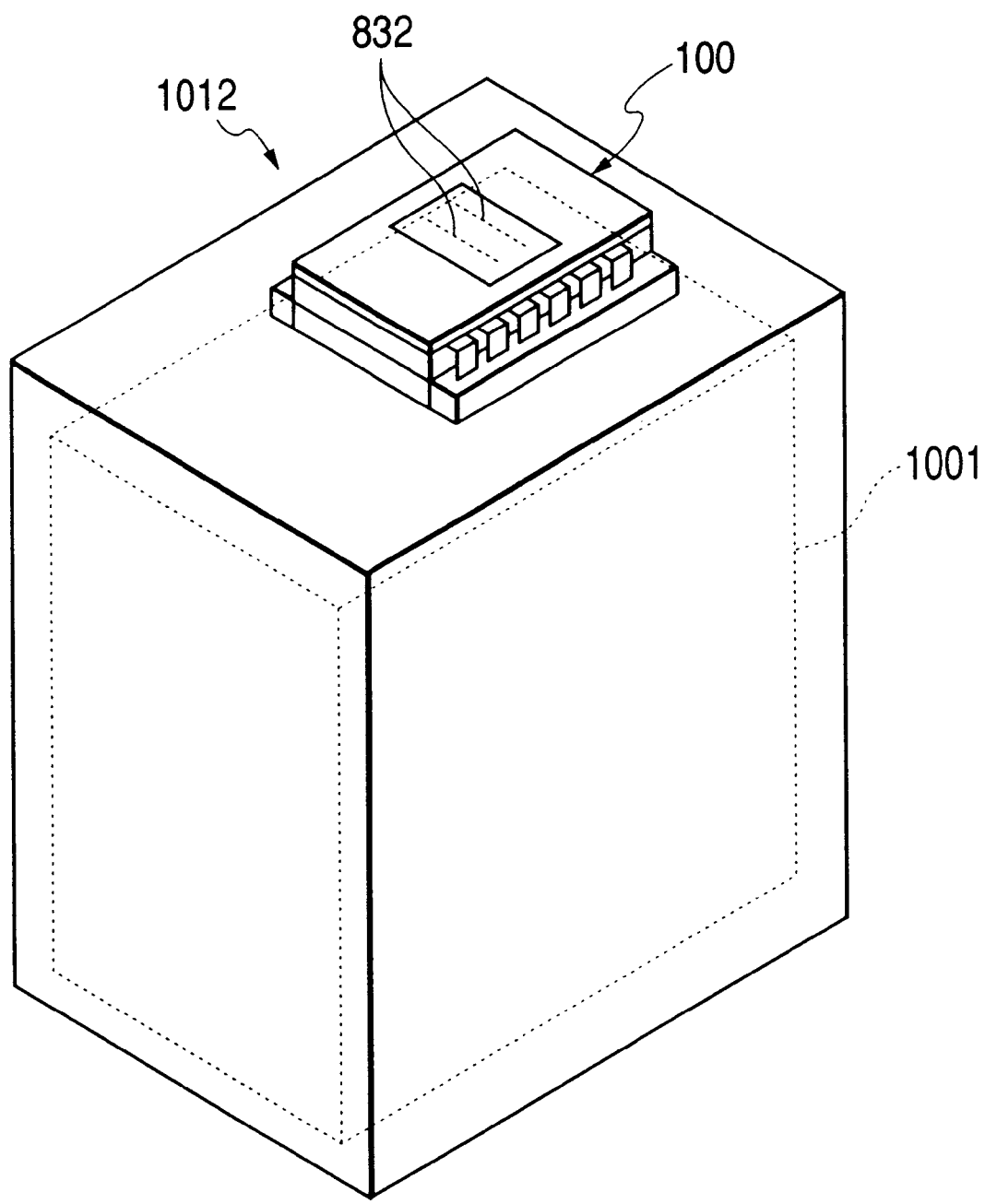
FIG. 11 is a schematic perspective view showing one example of ink-jet cartridge equipped with a liquid ejection head.

FIG. 11 shows one example of ink-jet cartridge mountable on the above ink-jet recording apparatus. The cartridge 1012 in this example is of serial type and its main part comprises an ink-jet recording head 100 and a liquid tank 1001 for storing a liquid such as ink.

On the ink-jet recording head 100, many ejection orifices 832 for ejecting a liquid are formed and a liquid such as ink is so arranged as to be led from the liquid tank 1001 via an unillustrated liquid supply path to the common liquid chamber (see FIG. 12) of the liquid ejection head 100. The cartridge 1012 is integrally formed of an ink-jet recording head 100 and a liquid tank 1001 and can supply a liquid into the liquid tank 1001 if necessary, but a structure of exchangeably linking a liquid tank 1001 to this liquid ejection head 100 may be adopted.

A specific example of the above liquid ejection head that can be loaded on an ink-jet printer of such a configuration will be described below in further details.

Figure 12:
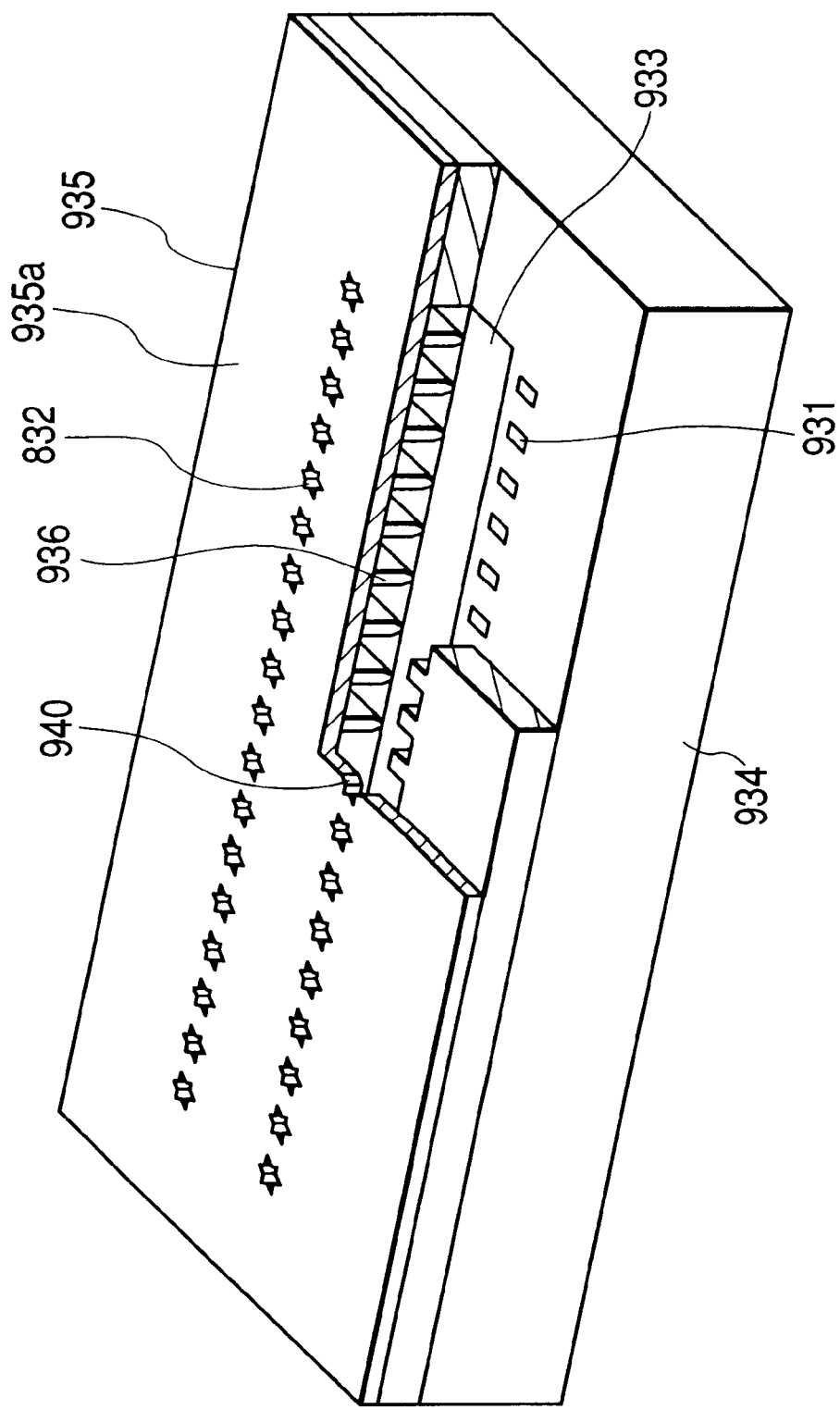
FIG. 12 is a schematic perspective view showing the principal portion of one example of liquid ejection head.

FIG. 12 is a schematic perspective view typically showing the main part of a liquid ejection head indicating the basic aspect of the present invention. FIGS. 13 to 16 are front views of ejection orifice shapes of the liquid ejection head shown in FIG. 12. Incidentally, electric wiring for driving an electrothermal converting element or the like is omitted.

In the liquid ejection head of this example, a substrate 934 made of glass, ceramics, plastic, metal or the like, for example, as shown in FIG. 12 is used. Such a material quality of the substrate is not essential to the present invention, but is not especially restricted if functionable as part of a flow path constituting member and functionable as the support of an ink ejection energy generating element and a material layer forming the liquid flow path and ejection orifice described later. Accordingly, in this example, a description will be made for the case of using a Si substrate. In addition to a forming method using a laser beam, for example, an ejection orifice is formed using the orifice plate 935 described later as a photosensitive resin by means of an exposure device such as MPA (Mirror Projection Aliner).

In FIG. 12, numeral 934 denotes a substrate comprising an electrothermal converting element (hereinafter, referred to as heater in some cases) 931 and a ink supply port 933 comprising a long-groove-shaped through hole as common liquid chamber section and an array of heaters 931 as thermal energy generating means is arranged longitudinally in zigzag form for each side of the ink supply port 933 at intervals of an electrothermal converting element of say 300 dpi. On this substrate 934, an ink flow path wall 936 for forming the ink flow path is provided. On this ink flow path wall 936, an ejection orifice plate 935 equipped with an ejection orifice 832 is further provided.

Here, in FIG. 12, the ink flow path wall 936 and the ejection orifice plate 935 are shown as separate members, but both of them can be also formed at the same time as one and the same member by forming this ink flow path wall 936 on the substrate 934, for example, by an approach such as spin coat. In this example, further, the side of the ejection orifice face (upper face) 935a is subjected to the water repellent finishing.

In this example, a serial type head in which recording proceeds while scanning in the direction of the arrowhead S of FIG. 10 is used to execute the recording, for example, at 1200 dpi. The driving frequency is 10 kHz, and at one ejection orifice the ejection is performed every the shortest time interval 100 $\mu$s.

Figure 13:
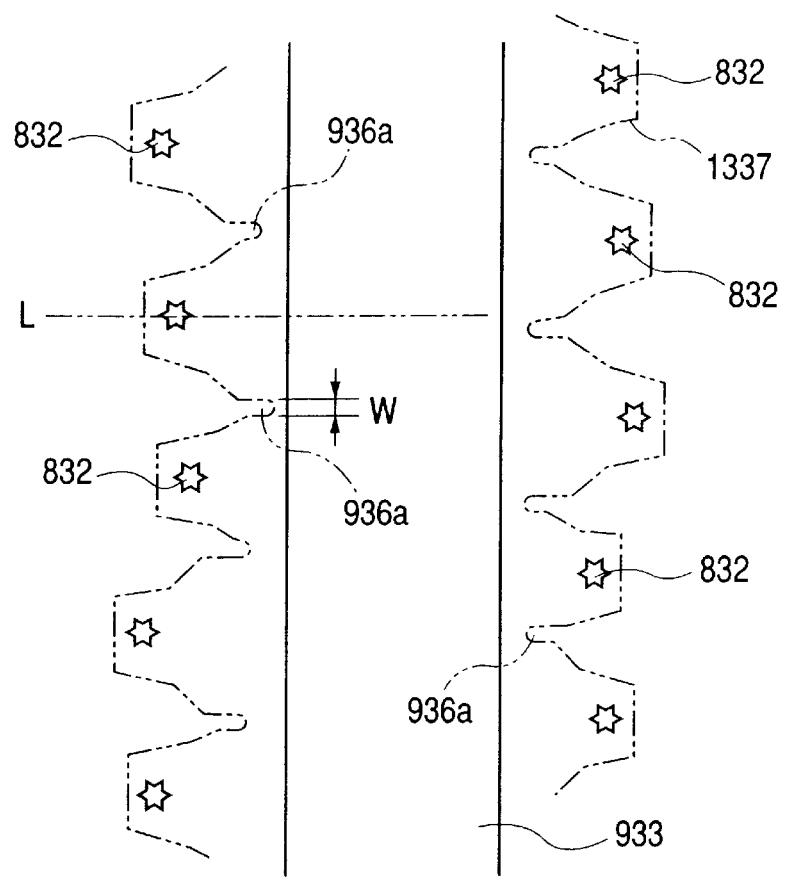
FIG. 13 is a conceptual drawing partially extracted from one example of liquid ejection head.
Figure 16:
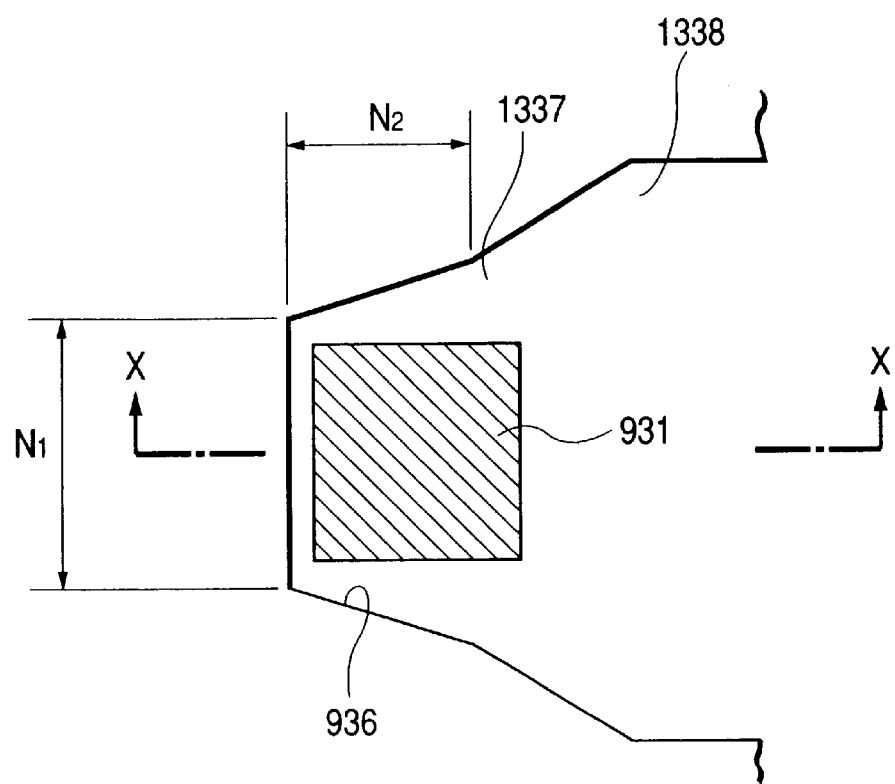
FIG. 16 is a schematic drawing of a principal portion in FIG. 13.

Besides, as one example of actual size of a head, the barrier 936a for fluidly isolating the adjacent nozzles has a width w=, say, 14 $\mu$m as shown in FIG. 13. As shown in FIG. 16, the bubbling chamber 1337 formed by the ink flow path wall 936 has $N_1$ (width size of the bubbling chamber)=33 $\mu$m and $N_2$ (length size of the bubbling chamber)=35 $\mu$m. The size of the heater 931 is 30 $\mu$m×30 $\mu$m and a value of heater resistance is 53 $\Omega$ (ohm) and the driving voltage is 10.3 V. Besides, an ink flow path wall 936 and barrier 936a, 12 $\mu$m in height, and an ejection orifice plate, 11 $\mu$m in thickness, are usable.

Among the sections of the ejection orifice part 940 provided on the ejection orifice plate including the ejection orifice 832, the shape of a section cut along a direction crossing the ink ejection direction (width direction of the orifice plate 935) is almost in the shape of a star and roughly comprises 6 convex portions 832a having obtuse angles and 6 convolute portions 832b disposed between these convex parts 832a and having acute angles. In other words, 6 grooves are formed in width (in the ejection direction of a liquid) of the orifice plate shown in FIG. 12 with convex portions 832a as a region locally farther from the center O of the ejection orifice taken for its vertices and convolute portions 832b as a region adjacent to this region and locally nearer to the center O of the ejection orifice taken for the bases. (Regarding the position of a groove, see 1141a of FIG. 17)

In this embodiment, the ejection orifice part 940 has a section cut along the direction crossing its width, being in the shape of a combination of two regular triangles comprising 27 $\mu$m long sides overlapped at a mutual rotation of 60 degrees, where $T_1$ shown FIG. 13 is 8 $\mu$m long. The angle of every convex part 832a is 120 degrees and the angle of every convolute part 832b is 60 degrees.

Thus, the center O of the ejection orifice coincides with the gravity center G of the polygon formed by connecting the centers (center (gravity center) of the figure made by connecting the vertex of a groove and two bases adjacent to this vertex) of mutually adjacent grooves. The opening area of the ejection orifice 832 in this example is 400 $\mu m^2$ and that of each groove (figure made by connecting the vertex of a groove and two bases adjacent to this vertex) is approx. 33 $\mu m^2$.

Figure 14:
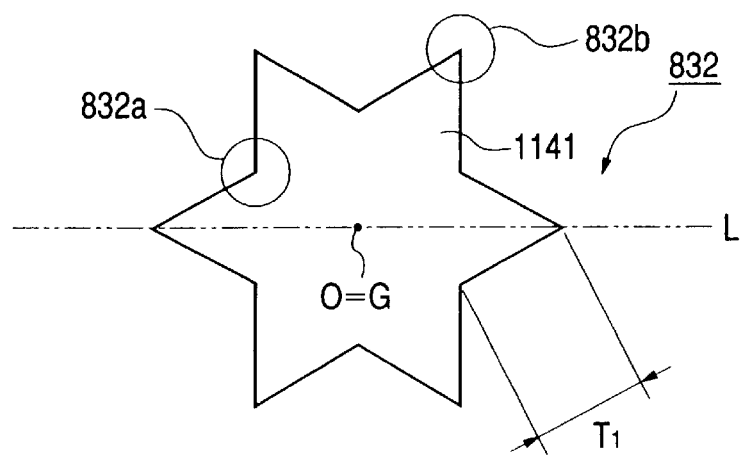
FIG. 14 is an enlarged view of the ejection orifice part shown in FIGS. 12 and 13.
Figure 15:
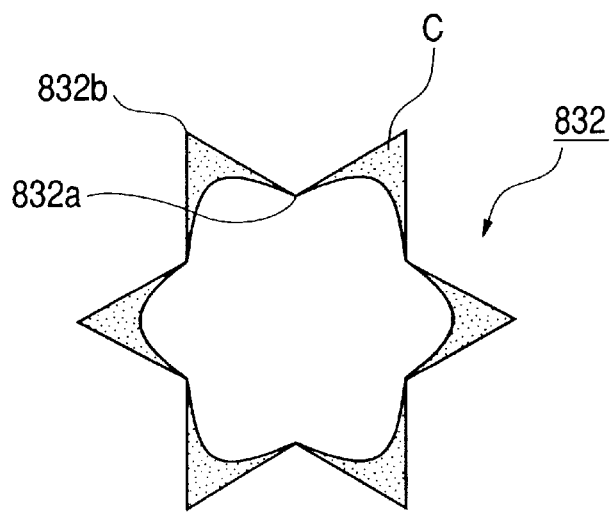
FIG. 15 is a schematic drawing showing the ink attachment condition in the ejection orifice part shown in FIG. 14.

FIG. 15 is a typical drawing showing the ink adherent condition of the ejection orifice part shown in FIG. 14.

Next, the ejection operation of a liquid by means of the ink-jet recording head of the above configuration will be described referring to FIGS. 17 to 24.

FIGS. 17 to 24 are sectional views for illustrating the liquid ejection operation by means of the liquid ejection head described in FIGS. 12 to 16 and X—X sectional views of the bubbling chamber 1337 shown in FIG. 16. In this section, the end in width of the orifice plate in the ejection orifice 940 corresponds to the vertex 1141a of a groove 1141.

Figure 17:
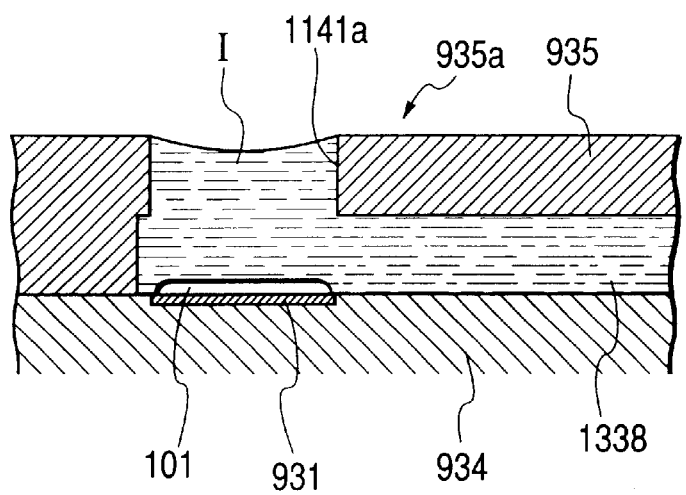
FIG. 17 is a schematic sectional view corresponding to an X—X perspective sectional shape in FIG. 16, for explaining a liquid ejection operation in a liquid ejection head with a lapse of time together with FIGS. 18, 19, 20, 21, 22, 23 and 24.

FIG. 17 shows a situation that a film-shaped bubble is generated on a heater, while FIGS. 18 to 24 show situations after the lapse of approx. 1 $\mu$s, approx. 2 $\mu$s, approx. 3 $\mu$s, approx. 4 $\mu$s, approx. 5 $\mu$s, approx. 6 $\mu$s and approx. 7 $\mu$s from FIG. 17, respectively. In the following description, "fall" or "sink" does not mean so-called fall in the gravitational direction, but refers to the move toward an electrothermal converting element independently of the mounting direction of a head.

Figure 18:
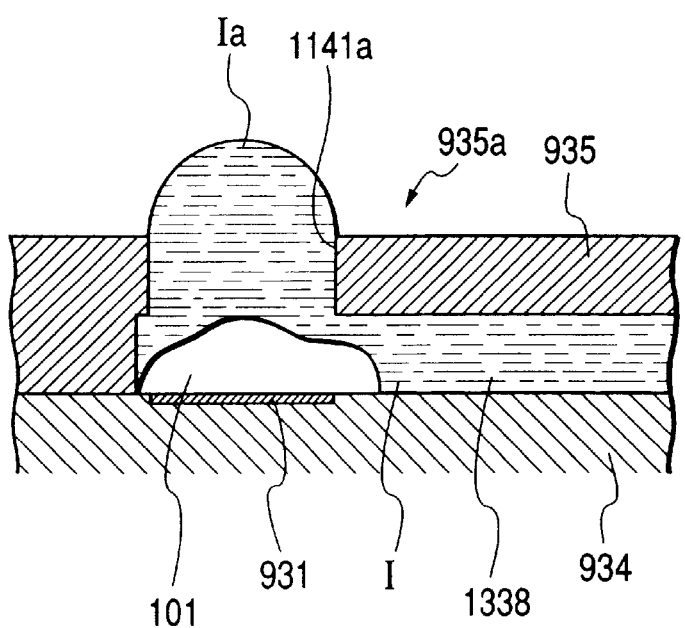
FIG. 18 is a schematic sectional view corresponding to an X—X perspective sectional shape in FIG. 16, for explaining a liquid ejection operation in a liquid ejection head with a lapse of time together with FIGS. 17, 19, 20, 21, 22, 23 and 24.
Figure 19:
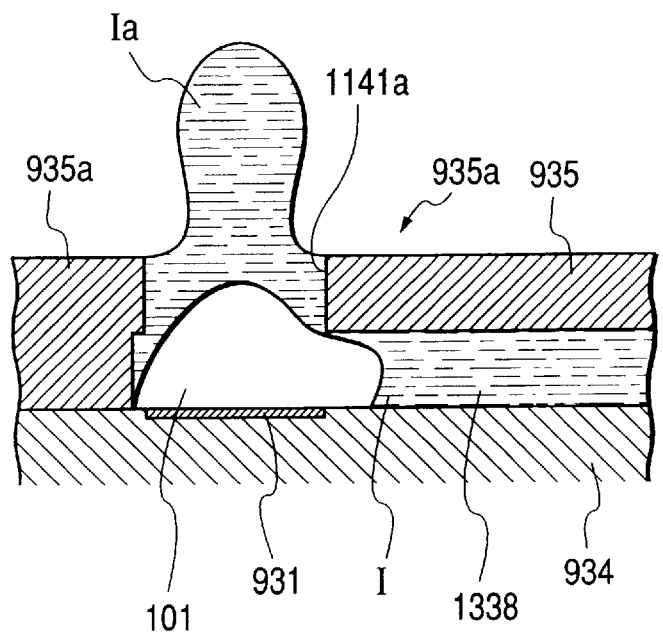
FIG. 19 is a schematic sectional view corresponding to an X—X perspective sectional shape in FIG. 16, for explaining a liquid ejection operation in a liquid ejection head with a lapse of time together with FIGS. 17, 18, 20, 21, 22, 23 and 24.

First, when a bubble 101 is formed in the liquid flow path 1338 on the heater 931 with the current conduction through the heater 931 according to a record signal or the like as shown in FIG. 17, a bubble 101 rapidly expands the volume and grows for approx. 2 $\mu$s as shown in FIGS. 18 and 19. The height of the bubble 101 surpasses the ejection orifice face 935a at the time of maximum volume, but at this time the pressure of the bubble decreases at a fraction from one tenth to four tenths of the atmospheric pressure.

Figure 20:
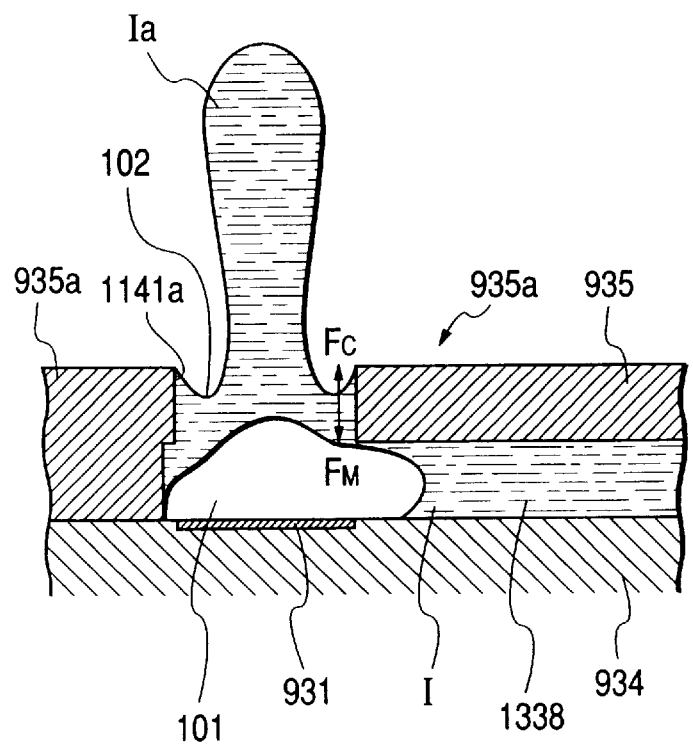
FIG. 20 is a schematic sectional view corresponding to an X—X perspective sectional shape in FIG. 16, for explaining a liquid ejection operation in a liquid ejection head with a lapse of time together with FIGS. 17, 18, 19, 21, 22, 23 and 24.

Next, at the elapsed point of approx. 2 $\mu$s from the formation of a bubble 101, the bubble 101 turns from the maximum volume to a decrease in volume, but almost simultaneously the formation of a meniscus 102 also begins. As shown in FIG. 20, this meniscus 102 retreats toward the side of the heater 931, or is falling.

Here, in this example, by provision of multiple grooves 1141 dispersed in the ejection orifice, a capillary force acts in the direction $F_C$ contrary to the meniscus retreat direction $F_M$ in the portion of grooves 1141. As a result, even if dispersion should be noticed more or less in the condition of a bubble 101 from any cause, the shape of a meniscus and a principal liquid droplet (hereinafter, referred to as liquid or ink in some cases) 1a at the time of retreat is so corrected as to become nearly symmetric to the center of the ejection orifice.

Figure 21:
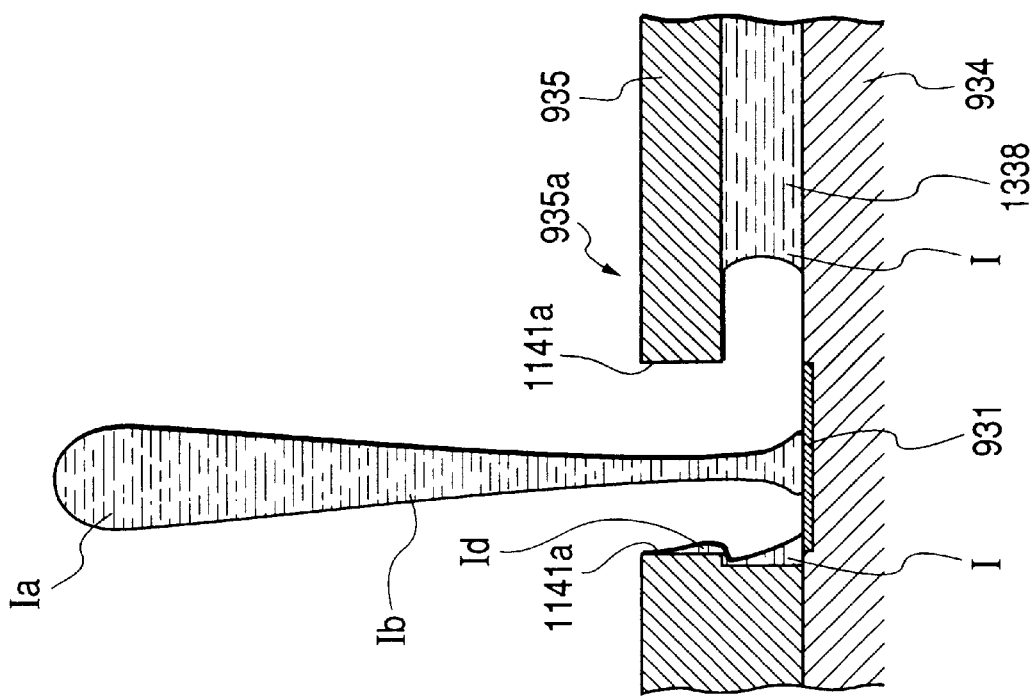
FIG. 21 is a schematic sectional view corresponding to an X—X perspective sectional shape in FIG. 16, for explaining a liquid ejection operation in a liquid ejection head with a lapse of time together with FIGS. 17, 18, 19, 20, 22, 23 and 24.

And, in this example, since the falling speed of this meniscus 102 is faster than the contraction speed of the bubble 101, the bubble 101 communicates with the atmosphere near the lower face of the ejection orifice 832 at the elapsed time of approx. 4 $\mu$s from the formation of the bubble as shown in FIG. 21. At this time, the liquid (ink) near the central axis of the ejection orifice 832 is sinking to the heater 931. This is because the liquid (ink) 1a pulled back to the side of the heater 931 due to a negative pressure of the bubble 101 before the communication with the atmosphere retains a speed in the direction of the heater 931 under action of the inertia after the atmosphere communication of the bubble 101.

Figure 22:
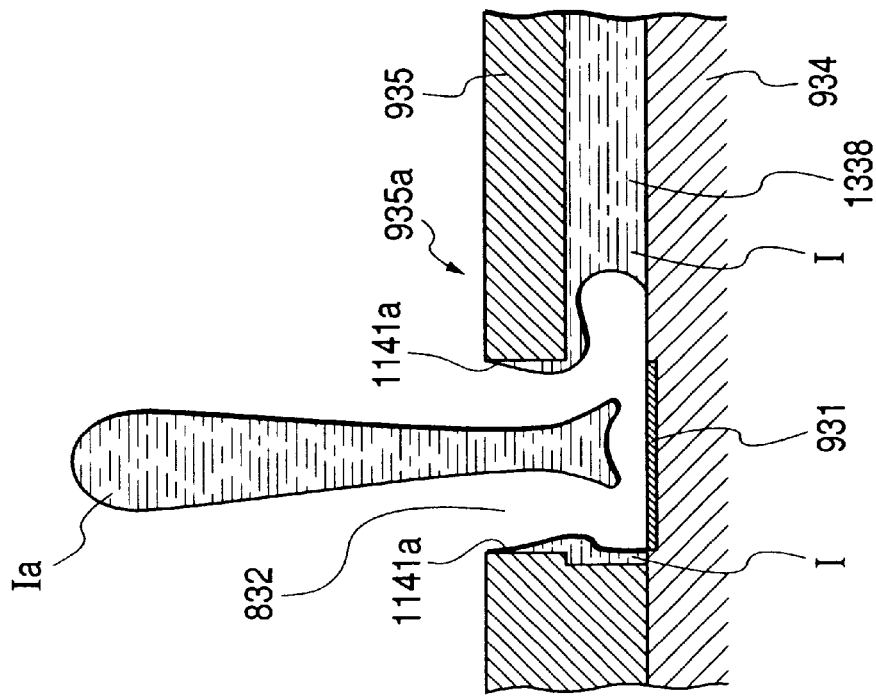
FIG. 22 is a schematic sectional view corresponding to an X—X perspective sectional shape in FIG. 16, for explaining a liquid ejection operation in a liquid ejection head with a lapse of time together with FIGS. 17, 18, 19, 20, 21, 23 and 24.
Figure 23:
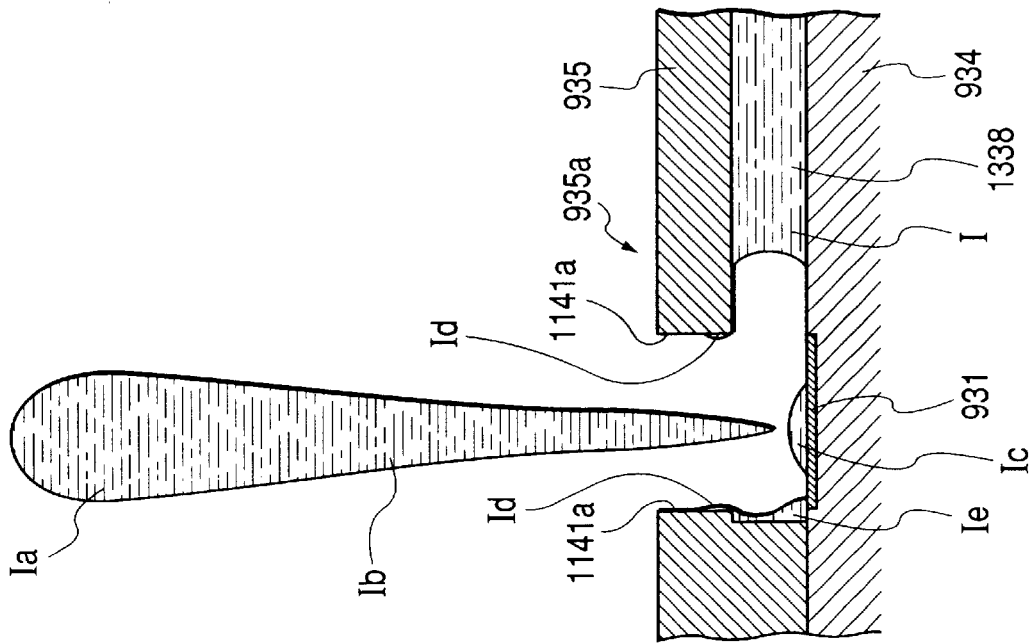
FIG. 23 is a schematic sectional view corresponding to an X—X perspective sectional shape in FIG. 16, for explaining a liquid ejection operation in a liquid ejection head with a lapse of time together with FIGS. 17, 18, 19, 20, 21, 22 and 24.

The liquid (ink) having sunk toward reaches the surface of the heater 931 at the elapsed time of approx. 5 $\mu$s from the formation of the bubble 101 as shown in FIG. 22 and is spreading so as to cover the surface of the heater 931 as shown in FIG. 23. The liquid having spread over the surface of the heater 931 like this has a horizontal vector along the surface of the heater 931, but a vector crossing the surface of the heater 931, e.g. a vertical vector, disappears, the spreading liquid tends to remain on the surface of the heater 931 and a liquid above it, i.e. a liquid retaining a velocity vector in the direction of ejection is pulled downward.

Figure 24:
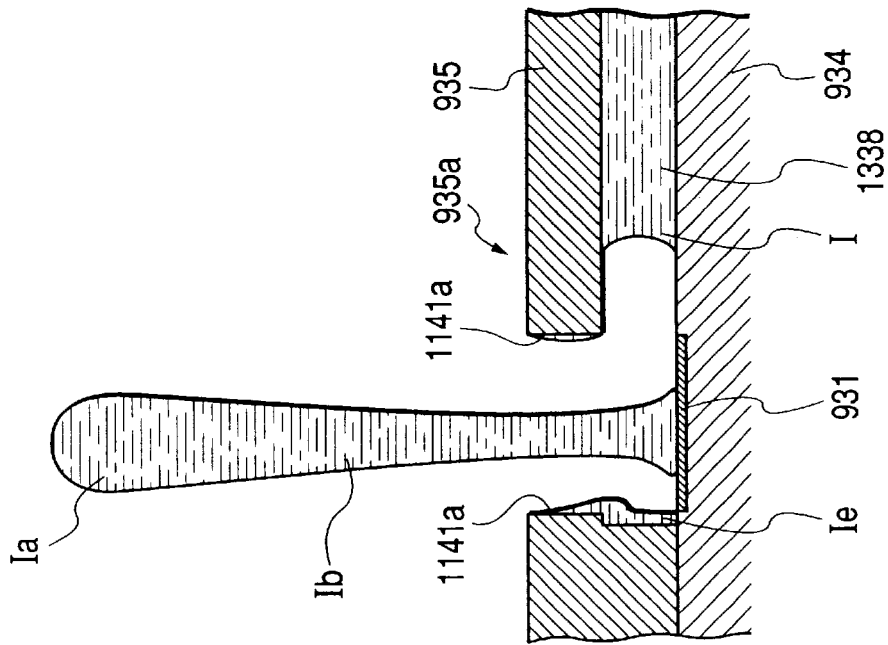
FIG. 24 is a schematic sectional view corresponding to an X—X perspective sectional shape in FIG. 16, for explaining a liquid ejection operation in a liquid ejection head with a lapse of time together with FIGS. 17, 18, 19, 20, 21, 22 and 23.

Thereafter, the liquid portion 1b between the liquid spreading over the surface of the heater 931 and the upper liquid (main liquid droplet) becomes thinner and is cut at the center of the surface of the heater 1 at the elapsed time of approx. 7 μs from the formation of the bubble 10 as shown in FIG. 24 and is separated into the main liquid droplet 1a retaining a velocity vector in the direction of ejection and the liquid 1c spreading over the surface of the heater 931. Like this, the position of separation is preferable inside the liquid flow path 1338 and well preferably to the side of the electrothermal converting element 931 rather than at the ejection orifice 832.

The main liquid droplet 1a has no deviation in the ejection direction, is ejected from the center of the ejection orifice 832 without ejection twist and is shot out at a given position on the recorded surface of a recording medium. On the other hand, the liquid 1c spreading over the surface of the heater 931 flies formerly in satellite droplets as the succeeding, but remains on the surface of the heater 931 and is not ejected.

Since the ejection of satellite droplets can be suppressed like this, the splash that is apt to occur with the ejection of a satellite droplet can be prevented and the recorded surface of a recording medium can be securely prevented from being stained with the mist floating in the foggy shape. In FIGS. 21 to 24, numerals 1d and 1e denote the ink adhering to the groove part (ink in the groove) and the ink remaining in the liquid flow path, respectively.

Like this, with the liquid ejection head of this example, the direction of the main droplet at the time of ejection can be stabilized by multiple grooves dispersed about the center of the ejection orifice in ejecting a liquid at the stage of volume decrease subsequent to the growth of a bubble to the maximum volume. As a result, the present invention can provide a liquid ejection head free of a twist in the ejection direction and highly accurate in ink shooting. Besides, the possibility of a stable ejection even for distributed bubbling at a high driving frequency enables a high speed and high precision printing to be actualized.

Especially since the first ejection of a liquid by communicating a bubble with the atmosphere at the volume decreasing stage of this bubble can prevent the mist occurring in ejection of a liquid droplet on communication of the bubble with the atmosphere, the adherence of a liquid droplet to the ejection orifice face can be also suppressed.

Besides, as another embodiment of a recording head in the ejection scheme of communicating a bubble with the atmosphere at the time of ejection, a so-called edge shooter type is referred to, for example, as described in Japanese Patent No. 2783647.

Among the whole ink-jet recording scheme, the present invention brings about an excellent effect especially in a recording head and a recording apparatus of the ink-jet scheme using a thermal energy to form a flight liquid droplet and to fulfill the recording.

With respect to its representative configuration and principle, those of execution using a basic principle disclosed, for example, in U.S. Pat. Nos. 4,723,129 and 4,740,796 specifications are preferable. This scheme is applicable to either of so-called on-demand type and continuous type, but is effective especially in case of an on-demand type because applying at least one driving signal, corresponding to a recording information item and giving a rapid rise in temperature above the film boiling, to the electrothermal converting element disposed corresponding to a sheet or liquid path in which a liquid (ink) is retained causes the electrothermal converting element to generate a thermal energy so that the film boiling occurs on the heat acting surface of a recording head and consequently a bubble in a liquid (ink) one-to-one corresponding to this driving signal can be formed. A liquid (ink) is ejected via an ejection orifice by the growth and contraction of this bubble to form at least one droplet. On making this driving signal into the shape of a pulse, the growth and contraction of a bubble proceeds immediately and pertinently, so that the ejection of a liquid (ink) excellent in response can be achieved and this shaping is well preferable.

As this pulse-shaped driving signal, such is suitable as described in U.S. Pat. Nos. 4,463,359 and 4,345,265 specifications. On adopting the conditions described in U.S. Pat. No. 4,313,124 specification related to an invention about the temperature rising ratio of the heat acting face, a still better recording can be performed.

As the configuration of a recording head, in addition to a combined configuration (straight line liquid flow path or rectangular liquid flow path) of an ejection orifice, a liquid path and an electrothermal converting element as disclosed in the above specifications, the configurations using U.S. Pat. Nos. 4,558,333 and 4,459,600 specifications which disclose a configuration that a heat acting part is disposed in a curved region are also included in the present invention.

In addition to this, the present invention is effective also as the configurations based on Japanese Patent Application Laid-Open No. 59-123670 which discloses a configuration of making a slit common to multiple electrothermal converting elements into the ejection part of electrothermal converting elements and on Japanese Patent Application Laid-Open No. 59-138461 which discloses a configuration bringing the opening for absorbing a pressure wave of thermal energy into correspondence to the ejection part.

Furthermore, as a recording head of full-line type having the length corresponding to the width of a maximum recording medium recordable of a recording apparatus, either of the configuration satisfying by a combination of multiple recording heads and the configuration as a single recording head formed integrally as disclosed in the above specifications may be available, but the present invention enables the above-mentioned effect to be still more effectively displayed.

Besides, also in case of using either an exchangeable recording head of chip type, whose mounting on the main apparatus body makes the electric connection to the main apparatus body and the supply of ink from the main apparatus body possible, or a recording head of cartridge type, in which an ink tank is integrally provided at the recording head itself, the present invention is effective.

Besides, because of stabilizing the effect of the present invention still more, addition of recovering means for a recording head, spare auxiliary means or the like provided as constituents of a recording apparatus according to the present invention is preferable. To be specific, capping means and cleaning means for a recording head, pressurizing or suction means, spare heating means using an electrothermal converting element or another heating element or a combination of these and also execution of a spare ejection method comprising performing an independent ejection of recording are effective.

Furthermore, not only a recording method of principal colors alone such as black but an integrally configured recording head or a combination of multiple recording heads may also be employed, but the present invention is extremely effective also for an apparatus equipped with multiple color ink of different colors or at least one of full color ink made by color mixing.

In the embodiments described heretofore of the present invention, ink is described as a liquid, but ink solidifying at and below room temperatures which softens or liquidities at room temperatures or ink which becomes liquid at the time of giving a use record signal is allowable because it is general in the above ink-jet scheme to regulate ink itself in temperature within a range of 30° C. to 70° C. and control the viscosity of ink within a range of stable ejection.

In addition, from the viewpoint of either positive prevention of a rise in temperature due to a thermal energy by its consumption as the energy for a state change from a solid to a liquid or use of ink solidifying as left alone for the purpose of preventing the evaporation, ink liquefying by adding a thermal energy in response to a recording signal to be ejected as liquid ink or ink liquefying first under action of a thermal energy as already beginning to solidify at the time of reaching a recording medium can be applied to the present invention. In such a case, ink may take a shape of confronting. an electrothermal converting element while retained as a liquid or solid in a recess or a through hole of a porous sheet as described in Japanese Patent Application Laid-Open Nos. 54-56847 and 60-71260. In the present invention, it is most effective to the above ink to execute the above film boiling scheme.

Still further, as shapes of recording apparatuses according to the present invention, in addition to those provided in one body or separately as the image output terminal of an information processing implement such as word processor or computer, those in the shape of a copier combined with a reader and further a facsimile device having a receiving/transmitting function are also available.

Next, the outline of a liquid ejection apparatus with the above liquid ejection head loaded will be described.

Figure 25:
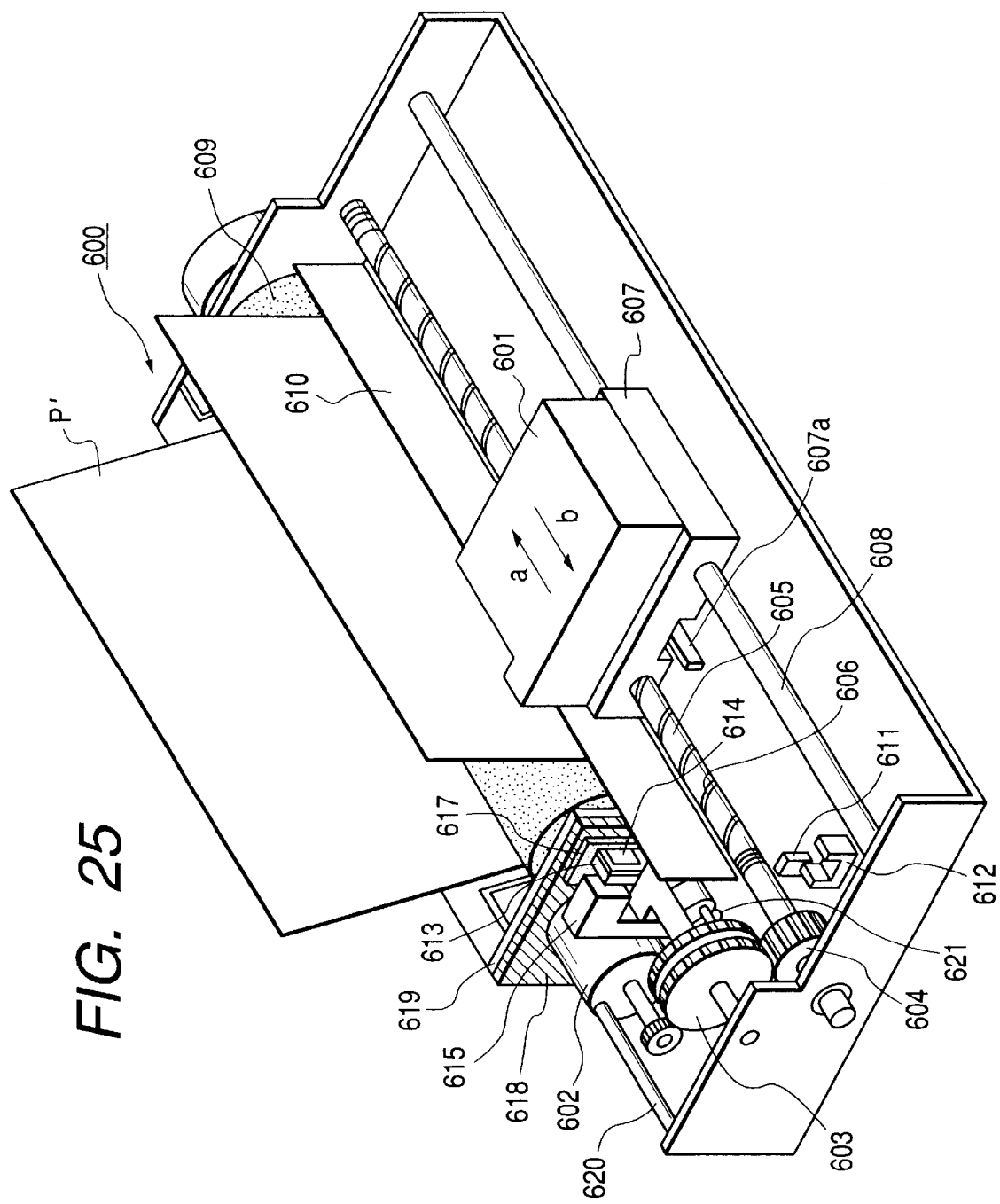
FIG. 25 is a schematic perspective view of an ink-jet recording apparatus 600 as an example of a liquid ejection apparatus to which a liquid ejection head according to the present invention is applicable.

FIG. 25 is a schematic perspective view of an ink-jet recording apparatus 600 as one applicable example of liquid ejection apparatus with a liquid ejection head according to the present invention mounted thereon.

In FIG. 25, an ink-jet head cartridge 601 is integrated of the above liquid ejection head and an ink tank for retaining the ink supplied to this liquid ejection head. This ink-jet head cartridge 601 is loaded on a carriage 607 engaged with the spiral groove 606 of a lead screw 605 rotating via driving transmission gears 603 and 604 in interlock with the normal and reverse rotation of a driving motor 602 and is moved reciprocally in the direction of the arrowheads a and b along the guide 608 by the motive force of the driving motor 602. A recording medium P is conveyed on a platen roller 609 by unillustrated recording medium conveying means and depressed to the platen roller 609 over the moving direction of the carriage 607 by a paper hold-down plate 610.

Near one end of the lead screw 605, photo couplers 611 and 612 are located. These are home position recognition means for recognizing the presence of a lever 607a of the carriage 607 in this area and switching the rotating direction of the driving motor 602.

The support member 613 supports the cap member 614 for covering the front face (ejection orifice face) having an ejection orifice of the above ink-jet head cartridge 601. Besides, the ink suction means 615 sucks the ink accumulated as a result of idle ejection from the ink-jet head cartridge 601 inside the cap member 614. By this ink suction means 615, the suction recovery of the ink-jet head cartridge 601 is carried out via the in-cap opening (not shown). The cleaning blade 617 for wiping the ejection orifice face of the ink-jet head cartridge 601 is provided in such a manner as movable back and forth (perpendicular to the moving direction of the above carriage 607) by the moving member 618. These cleaning blade 617 and moving member 618 are supported by the main-body support 619. The cleaning blade 617 is not limited to this shape, but other well-known cleaning blades may be available.

In the suction recovery manipulation of a liquid ejection head, the lever 620 for starting the suction moves with the move of the cam 621 engaged with the carriage 607 and the driving force from the driving motor 602 is controlled by well-known transmission means such as clutch switching. The ink-jet recording control section for giving a signal to a heat generating body provided at the liquid ejection head of the ink-jet head cartridge 601 or managing the drive control of all individual mechanisms mentioned above is provided on the side of the main apparatus body and not shown here.

The ink-jet recording apparatus 600 of the above configuration performs the recording to a recording medium P' conveyed by not shown recording medium conveying on the platen roller 609 while reciprocally moved all over the width of recording medium P'.

As described above, according to the present invention, there is provided a color ink-jet recording ink set capable of providing a high printing density and high grade image without bleeding or haze even if printing is carried out on so-called plain paper with black ink and color ink at one and the same scan. Also there are provided an ink-jet recording method using this and recording apparatus. Furthermore, according to the present invention, an ink set of high reliability as the ink-jet ink is obtained even though a pigment ink is used for black ink.

EXAMPLES

Next, referring to examples and comparative examples, the present invention will be described in further details. Hereinafter, part and % in the description is represented by weight, unless otherwise stated.

<Preparation Example of Self-dispersible Carbon Black>

First, the cationic self-dispersible carbon black to be used as the coloring material of black ink was prepared as follows.

Into a solution of 3.08 g $H_3N^+C_6H_4N^+(CH_3)_3Cl^-·I^-$ dissolved in 30 g water, 1.69 g silver nitrate is added with stirring. The generated precipitate is removed by filtration and the filtrate is added to a suspension of 10 g carbon black. The carbon black was of 230 $m^2/g$ in specific surface area and 70 ml/100 g in DBPA, and dispersed in 70 g water with stirring. Next, 2.25 g of concentrated hydrochloric acid was added and a solution of 0.83 g sodium nitrite dissolved in 10 g water was added. Then, the diazonium salt having a $NN^+C_6H_4N^+(CH_3)_3$ group as shown below reacted with carbon black to generate nitrogen gas. After bubbles of nitrogen gas settled, the dispersion was dried in an 120° C. oven. As a result, a product carbon black having $C_6H_4N^+(CH_3)_3$ groups on the surface was obtained.

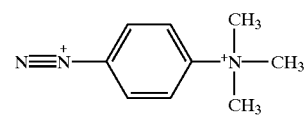

Example 1

Using the self-dispersible carbon black obtained above, the black ink having the following composition was prepared to make an ink set of Example 1 with the color inks of the following compositions.

| (1) Black Ink (cationic) | |
|---|---|
| carbon black | 4 parts |
| ethylene glycol | 8 parts |
| triethylene glycol | 5 parts |
| 1,5-pentanediol | 6 parts |
| water | 77 parts |
| (2) Yellow Ink (anionic) | |
| C. I. Acid Yellow 23 | 3 parts |
| glycerol | 5 parts |
| hexylene glycol | 5 parts |
| urea | 7 parts |
| sodium benzoate | 1.5 parts |
| water | 78.5 parts |
| (3) Magenta Ink (anionic) | |
| C. I. Acid Red 52 | 4 parts |
| 2-pyrrolidone | 7 parts |
| triethylene glycol monomethyl ether | 7 parts |
| urea | 7 parts |
| acetylenol EH (Trade Name: Kawaken Fine Chemical) | 1 part |
| sodium laurate | 2 parts |
| water | 72 parts |
| (4) Cyan Ink (anionic) | |
| C. I. Direct Blue 199 | 3 parts |
| dipropylene glycol | 8 parts |
| 1,2,6-hexanetriol | 7 parts |
| urea | 6 parts |
| ammonium benzoate | 2 parts |
| water | 74 parts |

Example 2

Using the self-dispersible carbon black obtained above, the black ink having the following composition was prepared to make an ink set of Example 2 with the color inks of the following compositions.

| (1) Black Ink (cationic) | |
|---|---|
| carbon black | 4 parts |
| ethylene glycol | 8 parts |
| triethylene glycol | 5 parts |
| 1,5-pentanediol | 6 parts |
| water | 77 parts |
| (2) Yellow Ink (anionic) | |
| C. I. Acid Yellow 23 | 3 parts |
| glycerol | 5 parts |
| hexylene glycol | 5 parts |
| urea | 7 parts |
| sodium laurylsulfate | 1.5 parts |
| water | 78.5 parts |
| (3) Magenta Ink (anionic) | |
| C. I. Acid Red 52 | 4 parts |
| 2-pyrrolidone | 7 parts |
| triethylene glycol monomethyl ether | 7 parts |
| urea | 7 parts |
| acetylenol EH (Trade Name: Kawaken Fine Chemical) | 1 part |
| sodium benzenesulfonate | 2 parts |
| water | 72 parts |
| (4) Cyan Ink (anionic) | |
| C. I. Direct Blue 199 | 3 parts |
| dipropylene glycol | 8 parts |
| 1,2,6-hexanetriol | 7 parts |
| urea | 6 parts |
| sodium N-lauroylmethyltaurinate | 2 parts |
| water | 74 parts |

Example 3

Using the self-dispersible carbon black obtained above, the black ink having the following composition was prepared to make an ink set of Example 3 with the color inks of the following compositions.

| (1) Black Ink (cationic) | |
|---|---|
| carbon black | 4 parts |
| ethylene glycol | 8 parts |
| triethylene glycol | 5 parts |
| 1,5-pentanediol | 6 parts |
| water | 77 parts |
| (2) Yellow Ink (anionic) | |
| C. I. Acid Yellow 23 | 3 parts |
| glycerol | 5 parts |
| diethylene glycol | 5 parts |
| urea | 7 parts |
| acetylenol EH (Trade Name: Kawaken Fine Chemical) | 1 part |
| trisodium naphthalene-1,3,6-trisulfonate | 2 parts |
| water | 77 parts |
| (3) Magenta Ink (anionic) | |
| C. I. Acid Red 52 | 4 parts |
| 2-pyrrolidone | 7 parts |
| triethylene glycol monomethyl ether | 7 parts |
| urea | 7 parts |
| acetylenol EH (Trade Name: Kawaken Fine Chemical) | 1 part |
| trisodium naphthalene-1,3,6-trisulfonate | 2 parts |
| water | 72 parts |
| (4) Cyan Ink (anionic) | |
| C. I. Direct Blue 199 | 3 parts |
| propylene glycol | 8 parts |
| 1,2,6-hexanetriol | 7 parts |
| urea | 6 parts |
| acetylenol EH (Trade Name: Kawaken Fine Chemical) | 1 part |
| disodium 1,5-naphthalene disulfonate | 2 parts |
| water | 73 parts |

Comparative Example 1

Using the black ink used in Example 1, the ink set of Comparative Example 1 was made with the color inks of the following compositions.

| (1) Black Ink (cationic) | |
|---|---|
| carbon black | 4 parts |
| ethylene glycol | 8 parts |
| triethylene glycol | 5 parts |
| 1,5-pentanediol | 6 parts |
| water | 77 parts |
| (2) Yellow Ink | |
| C. I. Acid Yellow 23 | 3 parts |
| glycerol | 5 parts |
| diethylene glycol | 5 parts |
| urea | 7 parts |
| acetylenol EH (Trade Name: Kawaken Fine Chemical) | 1 part |
| water | 79 parts |
| (3) Magenta Ink (anionic) | |
| C. I. Acid Red 52 | 4 parts |
| 2-pyrrolidone | 7 parts |
| triethylene glycol monomethyl ether | 7 parts |
| urea | 7 parts |
| acetylenol EH (Trade Name: Kawaken Fine Chemical) | 1 part |
| water | 74 parts |

-continued (4) Cyan Ink

| | |
|---|---|
| C. I. Direct Blue 199 | 3 parts |
| propylene glycol | 8 parts |
| 1,2,6-hexanetriol | 7 parts |
| urea | 6 parts |
| acetylenol EH (Trade Name: Kawaken Fine Chemical) | 1 part |
| water | 75 parts |

<Evaluation>

The black ink common to the ink sets of the examples 1 to 3 and Comparative Example 1 was charged into an ink cartridge BC-60 (a product of Canon) and the individual color inks into ink cartridges BC-62 (Canon).

Next, these ink-jet cartridges made up as mentioned above were mounted on an ink-jet recording apparatus BJF-800 (Canon) which ejects ink by applying thermal energy according to recording signals to carry out following evaluation. Incidentally, the BJF-800 used in the evaluation had been modified so that black ink and color ink are applied in the same one scan but the color ink is applied immediately after the black ink application to a region contiguous to the black region. Thus obtained print was evaluated in accordance with the following criteria. The result is shown in Table 1.

(1) Bleeding Between Black Ink and Color Ink

In the above printing test, two kind of plain paper, Copying Paper PB PAPER (Canon) and 4024 PAPER (Xerox), were used.

(Evaluation Method and Criteria)

Using each ink set and two kind of paper, a solid black image was printed and immediately after that, the solid yellow or magenta or cyan image was printed to be contiguous.

A: No bleeding is visually recognized in all boundaries.
B: Although slight bleeding is visually observed, no problem in practical use.
C: Although a little bleeding is visually observed, it is acceptable.
D: Marked bleeding is visually observed.

TABLE 1

| Evaluated Result | |
|---|---|
| Example 1 | C |
| Example 2 | B |
| Example 3 | A |
| Comp. Ex. 1 | D |

As evident from the result of the above Table 1, any of Examples 1 to 3 according to the present invention showed an excellent result concerning bleeding. When the color ink contains an anionic substance having a sulfo group, especially marked effect is obtained in reducing the bleeding.

What is claimed is:

1. An ink set for color ink-jet recording comprising a black ink and a color ink, wherein the black ink comprises a cationic self-dispersible carbon black, and the color ink comprises an anionic dye and an anionic substance, whereby bleeding at a boundary between a black image and a color image is alleviated by an ionic reaction between the black ink and the color ink.

2. The ink set according to claim 1, wherein the anionic substance has a carboxyl group.

3. The ink set according to claim 1, wherein the anionic substance has a sulfo group.

4. The ink set according to claim 3, wherein the anionic substance has a plurality of sulfo groups.

5. The ink set according to claim 1, wherein the anionic substance contains an aromatic ring to which a sulfo group is bonded.

6. The ink set according to claim 5, wherein a plurality of sulfo groups are bonded to the aromatic ring.

7. The ink set according to any one of claims 1 to 6, wherein the anionic dye is a dye having a sulfo group.

8. An ink-jet recording method, comprising the steps of:

ejecting a black ink comprising a cationic self-dispersible carbon black from an orifice in response to a recording signal; and ejecting a color ink comprising an anionic dye in response to a recording signal, wherein the color ink further comprises an anionic substance, wherein the ejected black ink and the color ink react ionically when the black ink and the color ink are brought into contact with each other on a recording medium.

9. The ink-jet recording method according to claim 8, wherein each ejection step further comprises the step of applying thermal energy to the ink to eject it.

10. A recording unit, comprising:

a first ink container containing a black ink of claim 1;

a second ink container containing a color ink of claim 1; and ink-jet heads for ejecting the black ink and the color ink respectively.

11. The recording unit according to claim 10, wherein the head is provided with a heater for applying thermal energy to the ink.

12. An ink cartridge, comprising:

a first ink container containing a black ink of claim 1; and a second ink container containing a color ink of claim 1.

13. An ink-jet recording apparatus, comprising:

a first ink container containing a black ink of claim 1;

a second ink container containing a color ink of claim 1; and ink jet heads for ejecting the black ink and the color ink, respectively.

14. The ink-jet recording apparatus according to claim 13, wherein the head section is provided with a heater for applying thermal energy to the ink.

15. The ink-jet recording apparatus according to claim 13, further comprising ink supply means for respectively supplying the black ink and the color ink contained in the first and second ink containers to the head section.

16. A method for alleviating bleeding in a boundary between a black image formed by an ink-jet method and a color image formed by an ink-jet method, wherein the black image is formed with a black ink comprising a cationic self-dispersible carbon black and the color image is formed with a color ink comprising an anionic dye and an anionic substance.

* * * * *

UNITED STATES PATENT AND TRADEMARK OFFICE
CERTIFICATE OF CORRECTION

PATENT NO. : 6,530,656 B1
DATED : March 11, 2003
INVENTOR(S) : Hisashi Teraoka et al.

It is certified that error appears in the above-identified patent and that said Letters Patent is hereby corrected as shown below:

Column 1,
Line 42, "one minutes," should read -- one minute, --.

Column 10,
Line 51, "energy the" should read -- energy --.
Line 52, "for ink" should read -- for the ink --.

Column 11,
Line 37, "Numeral" should read -- numeral --.
Line 58, "an not shown motor," should read -- a motor (not shown), --.

Column 13,
Line 18, "a" should read -- an --.

Column 15,
Line 3, "a" should read -- an --.

Column 19,
Line 21, "ing." should read -- ing --.

Column 24,
Line 47, "ink jet" should read -- ink-jet --.

Signed and Sealed this

Fourth Day of November, 2003

JAMES E. ROGAN
*Director of the United States Patent and Trademark Office*